US010761032B1

(12) United States Patent
Havener et al.

(10) Patent No.: US 10,761,032 B1
(45) Date of Patent: Sep. 1, 2020

(54) APPARATUS AND METHOD FOR INSPECTION OF A FILM ON A SUBSTRATE

(71) Applicants: BWXT Nuclear Operations Group, Inc., Lynchburg, VA (US); BWXT NOG Technologies, Inc., Lynchburg, VA (US); Aaron C. Havener, Pittsburgh, PA (US)

(72) Inventors: Aaron C. Havener, Pittsburgh, PA (US); James D. Jogerst, Forest, VA (US); Thomas C. Mohr, Forest, VA (US); Keith B. Rider, Prospect, VA (US)

(73) Assignees: BWXT Nuclear Operations Group, Inc., Lynchburg, VA (US); BWXT NOG Technologies, Inc., Lynchburg, VA (US)

( * ) Notice: Subject to any disclaimer, the term of this patent is extended or adjusted under 35 U.S.C. 154(b) by 0 days.

(21) Appl. No.: 16/286,370

(22) Filed: Feb. 26, 2019

(51) Int. Cl.
*G01N 21/94* (2006.01)
*G01N 21/88* (2006.01)

(52) U.S. Cl.
CPC ......... *G01N 21/8806* (2013.01); *G01N 21/94* (2013.01); *G01N 2021/8812* (2013.01); *G01N 2021/8835* (2013.01)

(58) Field of Classification Search
CPC ............. G03N 21/3581; G03N 21/956; G03N 21/8806; G03F 7/70588; G03F 7/70633

USPC ................. 356/368–369, 504, 512
See application file for complete search history.

(56) References Cited

U.S. PATENT DOCUMENTS

| 7,773,232 B2* | 8/2010 | Weidner ............... G01N 21/956 356/504 |
| 10,054,862 B2* | 8/2018 | Van Oosten ........ G03F 7/70525 |
| 10,215,695 B1* | 2/2019 | Farooq ............... G01N 21/8806 |
| 2004/0031567 A1 | 2/2004 | Engelbart et al. |
| 2011/0080585 A1* | 4/2011 | Rabello .................. G01B 11/24 356/368 |
| 2012/0320367 A1 | 12/2012 | Yanaka et al. |
| 2014/0139822 A1 | 5/2014 | Lange |
| 2014/0300890 A1 | 10/2014 | Lange et al. |
| 2015/0146193 A1 | 5/2015 | Buczkowski |

OTHER PUBLICATIONS

International Search Report and Written Opinion, PCT/US2020/019036, dated Jun. 22, 2020, 4 pages.

* cited by examiner

*Primary Examiner* — Hung Nguyen
(74) *Attorney, Agent, or Firm* — Nelson Mullins Riley & Scarborough LLP

(57) ABSTRACT

Methods of and apparatus for inspecting composite layers of a first material formed on a second material are provided including providing an illumination source, illuminating at least a portion of the composite at the layer, receiving light reflected from the sample, determining a spectral response from the received light, and comparing the received spectral response to an expected spectral response.

8 Claims, 16 Drawing Sheets

US 10,761,032 B1

APPARATUS AND METHOD FOR INSPECTION OF A FILM ON A SUBSTRATE

This invention was made with support under contracts awarded by the federal government. The U.S. Government has certain rights in this invention.

TECHNICAL FIELD

Example embodiments generally relate to material inspection and, in particular, relate to inspection of a layer of a first material on a second material of a composite.

BACKGROUND

Standard industry practice for material acceptability of composite components composed of zirconium, other corrosion resistant metals (including alloys), and/or welds is to assess the quality of an oxide film grown on the metal by any of various methods. Such techniques have also been used in the development of new alloys, in heat treating practices, and for evaluation of welding techniques. A film's acceptability can be assessed by the gain in the specimen's mass attributable to the film or by the oxide film's appearance to an operator. The mass gain technique provides a quantitative result but does not provide information about the oxide layer's quality, e.g. its thickness uniformity or the degree to which it contains contaminants. An operator judges a sample's appearance by visual comparison of the sample to a visual standard. Being subjective, the sample comparison technique's effectiveness depends upon various parameters, e.g. the inspector's training, skill, and experience, and control of the inspection area environment.

BRIEF SUMMARY OF SOME EXAMPLES

Some example embodiments may include composite layer inspection, as described below. In one example embodiment, a method of inspecting a composite of a layer of a first material formed on a second material that is different from the first material is provided including providing an illumination source that outputs light encompassing a wavelength range over which an expected spectral response occurs when light of the wavelength range reflects from the composite, where the composite has a first said material layer at a thickness expected in absence of a predetermined defect. At least a portion of the composite at the first material layer is illuminated with light from the selected illumination source. The light output from the illumination source that has reflected from the composite is received. A spectral response is determined from the received light, and the received spectral response is compared to the expected spectral response.

In another embodiment, a system for inspecting a first composite of a layer of a first material formed on a second material that is different from the first material comprises a camera configured to capture image data including at least a portion of the first composite, and a spectrometer disposed and configured to receive light reflected from at least a portion of the first composite at which the layer is present and determine an intensity spectrum of the light. An illumination source outputs light encompassing a wavelength range over which a predetermined spectral response occurs when light of the wavelength range reflects from the at least a portion of the composite at which the layer is present. Processing circuitry in operative communication with the spectrometer and the user interface, comprises a processor and a memory including computer program code configured to, with the processor, cause the processing circuitry to receive an intensity spectrum from the spectrometer arising from light output from the illumination source that has reflected from the composite, and compare the received intensity spectrum with a reference spectrum expected when light of the wavelength range reflects from a second composite comprised of the first material formed on the second material in absence of a predetermined defect.

In another example embodiment, an oxide layer inspection system is provided including a camera configured to capture image data including at least a portion of a sample, a spectrometer configured to measure reflectance of light from at least a portion of the sample, and processing circuitry including a processor and a memory including computer program code. The computer program code is configured to, with the processor, cause the processing circuitry to receive an indication of a material type for the sample, select an expected oxide layer thickness based on the material type, select an illumination source to create the desired spectral contrast based on the oxide layer thickness, illuminate at least a portion of the sample with the selected illumination source, and determine an oxide layer acceptability based on analyzing the oxide layer illuminated by the illumination source.

A still further embodiment of a method for inspecting an oxide layer includes determining a reference spectrum of light reflected from a surface of a first sample of a first material having an oxide film thereon over a wavelength range encompassed by the reflected light, wherein the first sample does not include a predetermined defect, and selecting an illumination source that outputs light encompassing at least part of the wavelength range. At least a portion of a second sample of a second material having an oxide layer with the light from the selected illumination source is illuminated, wherein the light reflected from the first material and the second material have respective spectral responses over the wavelength range that have a predetermined relationship. The light output from the illumination source that has reflected from the second sample, including the oxide layer of the second sample, is received. A measurement spectrum is acquired from the received light over at least part of the wavelength range that is encompassed by the light output from the illumination source. At least one characteristic of the measurement spectrum is compared to the same at least one characteristic of the reference spectrum, wherein the at least one characteristic varies in a predetermined manner depending upon whether a material and oxide film from which received light reflects contains the predetermined defect. Whether the material and oxide film of the second sample contain the predetermined defect is determined based upon the comparison of the at least one characteristic of the measurement spectrum to the same at least one characteristic of the reference spectrum.

BRIEF DESCRIPTION OF THE SEVERAL VIEWS OF THE DRAWING(S)

Having thus described one or more embodiments of a material inspection system in general terms, reference will now be made to the accompanying drawings, which are not necessarily drawn to scale, and wherein:

Figure 1:
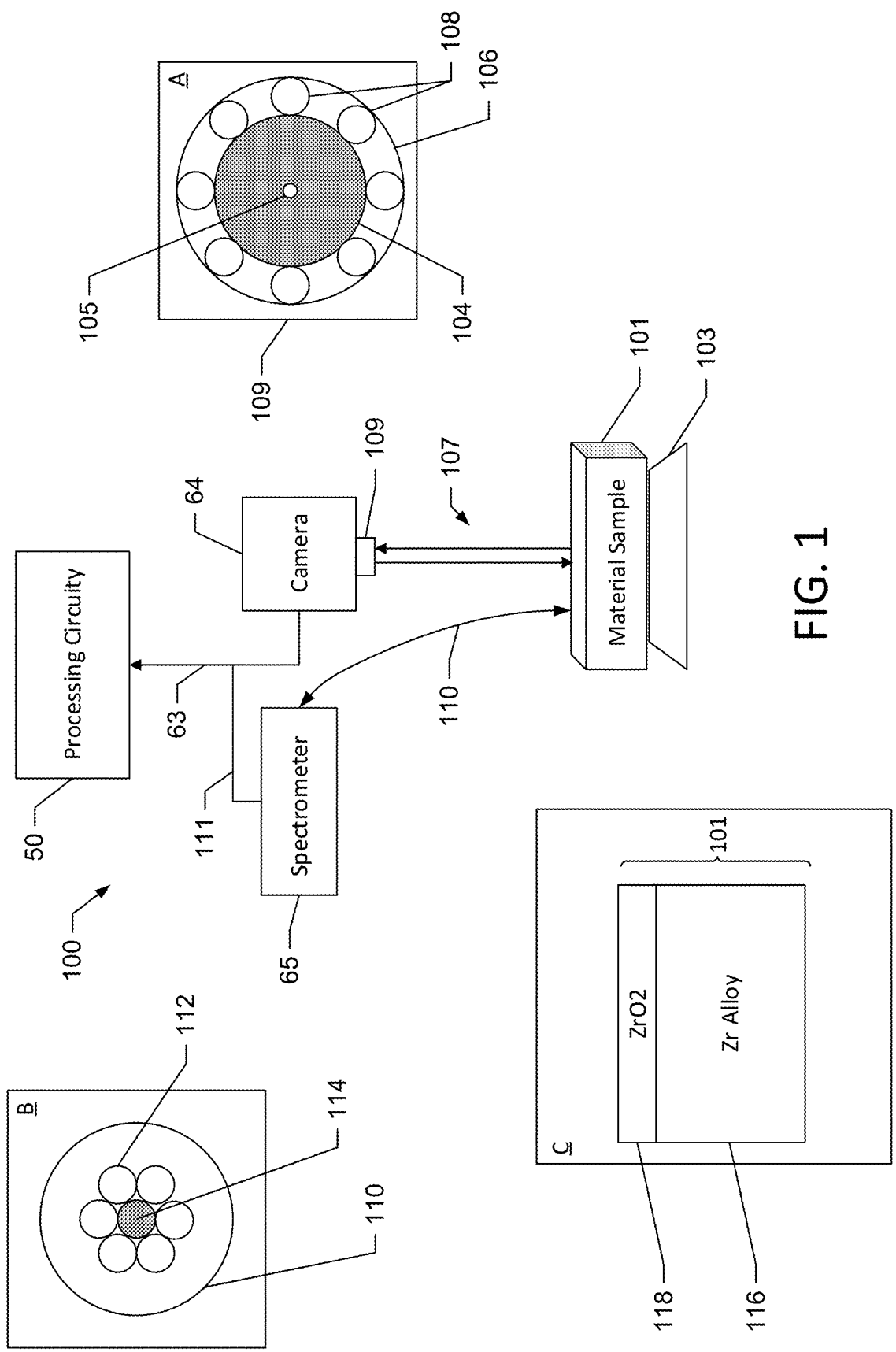
FIG. 1 is a schematic illustration of an oxide layer inspection system according to an example embodiment.

Repeat use of reference characters in the present specification and drawings is intended to represent same or analogous features or elements of the invention.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. It will be apparent to those skilled in the art that modifications and variations can be made in such example embodiments without departing from the scope or spirit thereof. For instance, features illustrated or described in one embodiment may be used on another embodiment to yield a still further embodiment. Thus, it is intended that the present invention covers such modifications and variations as come within the scope of the appended claims and their equivalents. Like reference numerals refer to like elements throughout.

Further, the term "or" as used in this application and the appended claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be understood to mean "one or more" unless specified otherwise or clear from the context to be directed to a singular form. Throughout the specification and claims, the following terms take at least the meanings explicitly associated therein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment" or other similar phrase, as used herein, does not necessarily refer to the same embodiment, although it may. The phrase "at least one of A and B" is satisfied by any of A alone, B alone, A and B alone, and A and B with others. The phrase "one of A and B" is satisfied by A, whether or not also in the presence of B, and by B, whether or not also in the presence of A.

The term "oxide layer" refers to a surface layer of a material which has been oxidized. The term "oxide layer" may be used interchangeably throughout this application with the terms "film" or "oxide film." It should be understood, however, that reference to an "oxide film" herein is for purposes of example only. As should be understood by the present disclosure, the inspection systems and methods described herein can be utilized with various composites having a first layer formed on a different second layer, for example a titanium nitride film formed on a steel substrate, a polymer film on a glass substrate, or films formed on solar panels, architectural glass, optics, or other devices. Accordingly, the detailed description herein providing one or more examples of systems and methods for inspecting composites comprising oxide layers on metal substrates should be understood to be exemplary in nature and not limiting of the present disclosure.

As should be understood, reactive metals are those metals that react readily with oxygen, water, or acids. Reactive metals can be useful in corrosion resistance because their surfaces oxidize almost instantly when exposed to air, thereby forming a composite in which the oxide layer is a barrier to further ionization/corrosion of the metal's surface. Following the initial surface oxidation, a film continues to grow as a result of ion diffusion and electron tunneling through the existing surface film to the underlying metal surface, but the film eventually grows to a thickness at which these processes cease. On most such metals, without the application of methods to enhance such formation, an approximately five nanometer ("nm") thick uniform oxide layer (or "natural" layer) forms. Applying an external electrical potential (e.g. via an electrochemical cell) to the metal, so that the metal acts as an anode in an electrolysis process, can overcome the film's normal tunneling barrier and allow the oxide film to grow to a thickness up to about two hundred nanometers. Such electrically-enhanced films (above around five nm and up to around 200 nm, and in particular within a range of about 100 nm to about 200 nm) are described herein as "thin" films. Alternatively, exposing the surface to higher temperatures and/or pressures can increase the ion diffusion rate and thereby allow the oxide film to grow to several hundred nanometers. Such films (above about 200 nm in thickness) are described herein as "thick" films. Oxide layers, whether grown in an unassisted manner or as thin or thick films, provide corrosion resistance to a substrate metal material beyond that provided by user-applied processes by further limiting or preventing diffusion of oxygen into the bulk of the material. However, the presence of impurities in the oxide layer, such as tungsten, carbon, nitrogen, or the like, may degrade the film's corrosion resistive properties, thereby creating a corrosion threat to the underlying metal or alloy. As a result, it is known to inspect metal surfaces having such films in order to detect the presence of such impurities, e.g. by visual inspection and determination of mass gain. In the former technique, a user visually inspects the oxide film to detect discontinuities in the surface film's color, intensity, or pattern, any of which could indicate the presence of an impurity that could indicate a weak point in the film. In the latter, the metal's surface area is determined, and the metal is weighed before and after the film's formation. Given the surface area, the weight increase can be correlated to mass increase per unit area and, in turn, oxide film thickness according to known techniques, such as provided by ASTM standards.

Mass gain and appearance inspection techniques may be limited in their effectiveness, however, in identifying abnormalities in the oxide layer due to the imprecise and sometimes subjective nature of their assessments and, in the case of visual inspection, their inability to operate outside the visible light spectrum (in that some abnormalities appear outside that spectrum). Exemplary systems and methods as disclosed herein may provide an improved inspection of oxide films on corrosion resistant alloys (such as zirconium) through the user of optical imaging and spectroscopy, creating more reliable methods by which to detect abnormal film and reducing the number of false positives for contamination.

As indicated below, appearance characteristics of a thin oxide film are generally due to interference among reflections of incident light from the oxide film's top and bottom surfaces. Therefore, interference effects are wavelength-specific, with the specific wavelength/wavelength band at which they occur affected by oxide film thickness, which, in turn, is affected by contaminant type. In addition to interference effects, light may also be scattered or absorbed by the oxide layer or the metal substrate. Absorption or scattering of light causes changes in the color or intensity of the reflected light, which may also indicate a deviation in oxide layer thickness or contamination. While absorption and scattering do occur, their effects generally do not vary with thickness of the oxide film. Because interference effects do generally vary with film thickness, the presently discussed systems and methods may rely upon these effects in determining presence or absence of oxide film defects as discussed herein.

Abnormal film characteristics, such as film thickness variation caused by surface flaws, material contamination, surface contaminants, or the like, may be apparent due to the contrast between affected and unaffected areas in the visual spectrum and, thus, detectable through visual inspection. However, surface visual inspection is subjective, can be logistically difficult in certain circumstances, and can require the operator to have sufficient experience to recognize differing appearances of the film surface. To the extent the human inspector relies upon diffuse reflection, the specific wavelength contrast effect may be significantly reduced or indiscernible (from the standpoint of visual inspection). Further, where the contrast arising from a thickness variation exists in a part of the electromagnetic spectrum (e.g. ultraviolet or infrared) to which the eye is not sensitive, inspection by reliance on the naked eye can be incomplete.

One or more exemplary processes described herein enable increased reliability and repeatability in finding regions of abnormal film due to the display of greater contrast and the ability to characterize spectrographic minima peak wavelength, spectrum intensity, and spectrum shape for this purpose. This process is more reliable than current methods of measuring the weight gain of specimens or visual inspection compared to a standard. Additionally, composite layer, e.g. oxide layer, inspections using the process described with respect to one or more embodiments herein may require less time to employ due to the ability to automate portions of the process, enhance contrast using computer algorithms, and avoid consultations among highly-trained inspectors. Finally, an in-situ, non-contact method for determining the cause of the abnormal oxide or other film may be faster, non-disruptive to a composite component's surface, and more flexible in location than current physical sample methods, such as scanning electron microscope (SEM), microprobe, energy-dispersive X-ray spectroscopy (EDX), or the like.

As discussed above and in further detail below, an oxide film inspection technique using a shortwave infrared (SWIR) camera and a reflectance spectrometer may be utilized to determine the acceptability of the film and/or presence of contaminants. The camera may permit real-time imaging of relatively large surfaces to identify areas with abnormal film, which can then be further interrogated using a fiber-optic reflectance spectrometer.

Due to the interference, absorption, and scattering effects on light of different wavelengths, a camera may be used to identify one or more abnormalities in a film. The camera is optimized for use at one or more wavelength ranges, by selecting appropriate light sources and/or filters, for example causing the camera to operate within the SWIR wavelength range. The SWIR wavelength range may be considered to extend from about 0.9 µm to about 1.7 µm but in other embodiments may be considered to range from about 0.7 µm to about 2.5 µm. The camera may identify one or more portions of the film that have less reflectance than the surrounding film. The areas of lower reflectance indicate greater interference, absorption, or scattering of light, which is, in turn, indicative of a difference in the thickness or composition of the oxide film. Since a camera, unlike the human eye, can be optimized for different wavelength ranges, the camera inspections (the camera image presented at the user interface display encompasses at least a portion, and in some embodiments all, of the SWIR wavelength range in the acquired light reflected from the sample surface) may reveal oxide layer abnormalities that would be undetected by the human eye. Under some quality assurance standards, mere detection of an abnormality may be sufficient to reject a material or component. In other cases, detection of the abnormality during the camera inspection provides the user with guidance to identify areas that require further inspection, such as via a reflectance spectrographic inspection.

Oxide films, particularly thin oxide films, can have minima in their specular reflectance spectra that provide a reliable indicator of film quality. One or more peak minima may occur in these spectra due to interference effects that cancel some amount of light over ranges centered at one or more particular wavelengths. Generally, part of light incident to the oxide layer reflects off the layer surface, while the remainder enters the film and passes to the interface between the film and the metal substrate. Some of that light energy, in turn, passes into the substrate, but the remainder passes back up through the oxide film, from which some will exit the film and combine with that part of the incident light that reflects directly from the oxide layer surface. Generally, the index of refraction of the oxide layer will be greater than that of the air on one side of the oxide layer and may be less than or greater than that of the metal substrate on the other side. Where the refraction index is greater than that of both air and the metal substrate, the incident light that reflects directly off of the oxide layer surface changes phase by 180°, while the light that reflects from the interface between the oxide layer and the metal substrate does not change phase. Given these conditions, the degree to which the light that reflects from the oxide layer/metal substrate interface adds to or interferes with the light that reflects from the upper oxide layer boundary with air depends on the film's thickness, reaching peak interferences when the film thickness is an integer multiple of ½ the light's wavelength. At such thicknesses, the light reflecting from the film/substrate interface moves through an integer multiple of the light's full wavelength as it travels through the film, with a net 0° phase shift as it exits the film at the surface and being 180° out of phase with the light reflecting from the top of the film. Thus, light at wavelengths that are a 2/N multiple of the thickness of the film (where N is a non-zero integer) may have the smallest shifts in phase. Since this portion of the reflected light is at the same frequency and approximately opposite phase, with respect to the light entering and returning back out of the film, incident light at such wavelengths results in maximum interferences in the light returning to the spectrometer from the oxide layer surface, resulting in peak minima in the specular reflectance spectrum. Where the refraction index is greater than that of air but less than that of the metal substrate, the incident light that reflects directly off of the oxide layer surface changes phase by 180°, while the light that reflects from the interface between the oxide layer and the metal substrate also changes phase by 180°. Again, the degree to which the light that reflects from the oxide layer/metal substrate interface adds to or interferes with the light that reflects from the upper oxide layer boundary with air depends on the film's thickness but in this instance reaches peak interferences when the film thickness is an odd multiple of ¼ the light's wavelength. As should be understood in view of the present disclosure, however, such conditions are not ideal and not entirely predictable. Thus, for example, while the half or quarter wavelength positions can be relied upon for rough estimates, the peak minima occur at wavelengths offset from these positions, e.g. varying due to path length or material identity. Further, under either condition discussed above, the first order peak minimum is strong and relatively wide, with higher order peak minima becoming less deep, narrower, and closer together.

Accordingly, where the incident light is comprised of a wavelength range that encompasses one or more of these 2/N multiples of (or odd multiples of ¼) film thickness, the resulting wavelength spectrum of the reflected and received light may include one or more minimum peaks at wavelength positions that, therefore, correlate to the thickness of the film to which the light was incident. The identification of the wavelength locations of those peaks for a given oxide layer sample, therefore, can identify the thickness of the oxide layer and can be used to compare oxide layer thickness from one sample to another. For example, assume that a normal (without oxide layer-thickness-impacting defects) thin film on a first example alloy has a reflectance minimum in its specular reflectance spectrum at 570 nm and that a film on a second example alloy has a reflectance minimum at 550 nm. The method described herein is capable of distinguishing the difference in the reflectance minima, e.g. 20 nm. Such information, for example where the two samples are of the same substrate and have the same oxide layer formation method, may indicate that thicknesses of the two samples differ because the oxide layer of one of them has a defect. Alternatively, the information may indicate that the samples have different substrates and/or oxide layer formation methods. As a further example, and considering thin films, the respective minimum peaks in the specular reflectance spectrum (within a wavelength range selected as described herein) acquired by spectrometer 65 (FIGS. 1 and 15) from measurements taken of the first alloy and the second alloy each shifts to a shorter wavelength when the measurement is taken over an area of the alloy contaminated by tungsten, as compared to minimum peaks of reflectance spectra from measurements taken over non-contaminated areas. Distinctive color shifts associated with abnormal film may be observed not only in specular reflectance spectra, but also in a visible spectrum photographic inspection using appropriate filters and light sources.

Some films, including some thick films, have a relatively featureless specular reflectance spectrum, e.g. the specular reflectance may not include well-defined peak minima. This may occur, for example, in thick films in which the film thickness is much greater than the incident light wavelength, as under such conditions absorption and scattering effects as light passes through the oxide layer can tend to overcome the interference effects, even at the 2/N or odd ¼ wavelengths. Instead, however, the film may include a shift in intensity of the specular or diffuse reflectance, and advantage may be taken of such an intensity shift to identify film thickness variations and, thereby, the presence of oxide film defects. For example, a film may be sampled at multiple locations, and a change in intensity of the specular or diffuse reflectance may be used to identify abnormalities. The change in intensity may be due to absorption and/or scattering of light as light passes through the oxide film, which reduces the total light reflected back to the spectrometer. Light may be absorbed by either the oxide film layer or the metal but should have a relatively uniform spectral reflectance profile. A change in thickness or composition of the oxide layer, such as by contamination, may cause a change in the absorption of the light, thus changing (increasing or decreasing, depending on the whether the oxide layer decreases or increases in thickness, respectively) the intensity in the light returning from the oxide layer to the spectrometer. Similarly, light may be scattered by interaction with the oxide layer and/or the metal, but should have a relatively uniform spectral reflectance profile. A change in the thickness or composition of the film, such as by contamination, may cause a change in the amount of light scattered (because the longer light travels through the material, the more scattering occurs), thus changing (increasing or decreasing, depending on whether the oxide layer decreases or increases in thickness, respectively) the intensity of the specular reflectance.

In an example embodiment of the present disclosure, a method for inspecting an oxide layer of a material includes selecting an illumination source to produce light having a predetermined characteristic (e.g. a specific wavelength range within the incident light that, upon reflection from the metal surface upon which the oxide layer is formed, is passed by a camera's bandpass or high pass filter tuned to a band that includes that wavelength range) to thereby permit identification of a predetermined response (e.g. a shift in spectral response) in the reflected light arising from a defect in the oxide film corresponding to a variation in the oxide film's thickness. The film defect, for example the presence of an impurity or a material variation in the oxide layer's formation, alters the oxide film's thickness from its normal thickness in the absence of the defect. The magnitude of the oxide layer's defect-induced thickness variation depends upon the type of material upon which the film is formed, the oxide layer's normal thickness, and the layer's consistency in its constituent material. A shortwave infrared (SWIR) camera and/or a spectrometer may be utilized to capture an image or measurement of the oxide layer as illuminated from the selected illumination source that emits light at least partially within, and in some embodiments fully within, the SWIR wavelength range and that may encompass some or all of the SWIR wavelength range. A user may then visually inspect a display of a resulting camera image to identify the defect's presence based on image contrast. In addition, or alternatively, a spectrometer may analyze the data to identify a spectral response that indicates the defect. Still further, in addition to these steps, the user may visually inspect the surface to determine the presence of defect-inducing contrast areas within the reflected light within the visible spectrum.

FIG. 1 illustrates an oxide layer inspection system 100 according to an example embodiment. A material sample 101 selected for inspection may be a test component or sample inspected in a laboratory setting for acceptability for use in a system, such as a nuclear reactor or steam system, or may be a system component inspected in situ at the time of its installation or after a repair, such as including a weld. In an instance in which the material is a system component, whether material 101 is inspected in a laboratory setting or, alternatively, in an installed or uninstalled position on site rather than in the laboratory may depend, for example, on the sample's size, weight, and other component characteristics. As discussed below, the inspection of the oxide layer of the material 101 by the system illustrated in FIG. 1 may be performed by an operator, an inspection system 40 (FIG. 15), or a combination of the operator assisted by inspection system 40. The operator or inspection system 40 utilizes a camera 64 to capture an image of an inspection area on a sample of the material 101. As should be understood, it is known for cameras to have the capability to acquire data in still image or video format that can be stored and uploaded to computers and other systems in batch form or that can be output in real time, and camera 64 should be understood to have such capabilities. Accordingly, the construction and operation of such cameras is not discussed in further detail herein. In the embodiments described herein, camera 64 outputs the camera video data in real time via a suitable data cable 63 that connects to the processing circuitry 50, which in turn renders the camera image on a user interface 60 (FIG. 15) for operator analysis.

Figure 15:
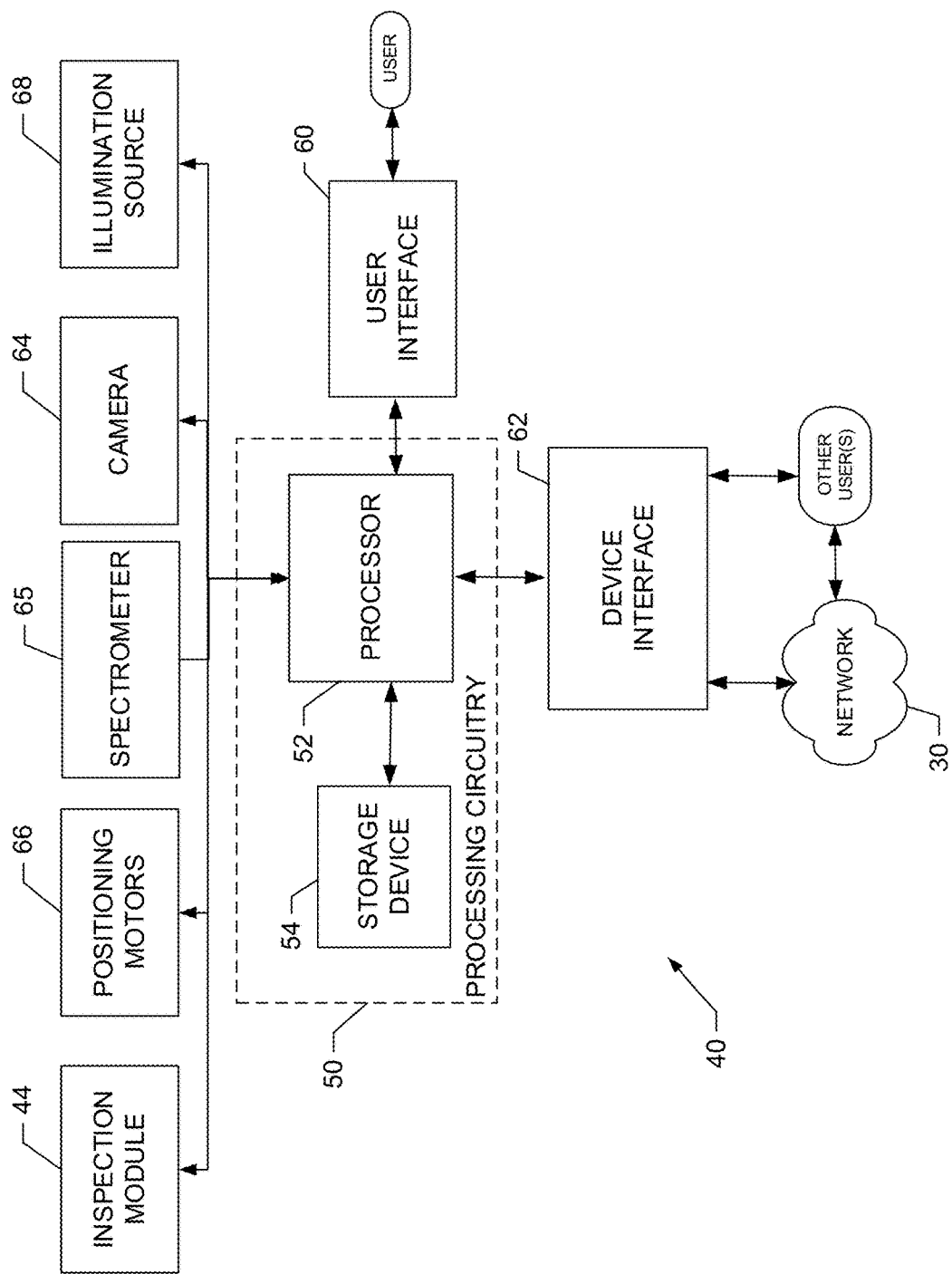
FIG. 15 is a functional block diagram of the system as in FIG. 1.

Camera 64 may be a SWIR camera configured to capture camera data in the SWIR spectral range with wavelengths longer than the light range visible to the human operator. Additionally or alternatively, camera 64 may be configured to capture camera data in other spectral ranges, for example including ultraviolet, (UV), visible (VIS), infrared (IR), long-wave infrared (LWIR), or other suitable wavelengths. In an example embodiment, camera 64 may be a hyperspectral camera configured to capture camera data for a plurality of wavelength ranges simultaneously. Camera 64 may include or be associated with one or more illumination sources 68 (FIG. 15), such as light emitting diodes (LEDs), florescent lights, incandescent lights, or the like, where the illumination source is configured to emit light at a selected predetermined wavelength range. The camera may include filters to pass only reflected light to the camera that is within the predetermined wavelength range or may include processing circuitry that excludes image data outside the predetermined wavelength range from the received image data that the system uses to drive the display at user interface 60 (FIG. 15).

In an example embodiment, camera 64 may have one or more light sources incorporated into a lens assembly 109, as shown in detail A of FIG. 1, that includes a camera lens 104 with one or more light-emitting devices, e.g. LEDs 108, positioned about lens 104 in a light mount 106. Collectively, LEDs 108 form the camera's illumination source. Light mount 106 mechanically connects LEDs 108 to camera 64, and the camera's power source may also drive the LEDs. In the illustrated embodiment, light mount 106 coaxially aligns LEDs 108 about an optical axis 105 of lens 104 (aligned with the double arrows shown in FIG. 1 between lens 109 and the surface of sample 101) so that the center axis of illumination (of light propagation) of each LED 108 is parallel to lens optical axis 105, resulting in specular reflection, such that a portion of light emitted from the LEDs reflects from a surface of the sample 101 back into the lens. In certain embodiments, the LEDs 108, when mounted on camera 64, are oriented so that the center axes of the light emanating therefrom are disposed at a non-zero angle with respect to the camera optical axis, resulting in diffuse reflection. In other embodiments, the LEDs 108 or other illumination source 68 (FIG. 15) may be separate or separable from camera 64 and/or lens 104 (while still being connected to a power source such that the light source continues to emit light), such that an operator may mount the light source on another structure, or manually hold the light source in a position, so that light source(s) center axis/axes of illumination is/are disposed at a non-parallel angle with respect to the optical axis of camera 64. Of course, even when so moved from the camera, the operator may dispose the light source so that its center axis of illumination is still parallel with the camera optical axis. In this way, the operator may move the light source to various positions and orientations with respect to the camera optical axis, while simultaneously viewing the camera output (where the camera is fitted with an optical bandpass filter tuned to the selected wavelength range) at the user interface display, until finding an orientation between the light source and the camera optical axis that results in maximum contrast in the resulting images.

As should be understood, the camera includes an optical sensor disposed with respect to the lens so that the lens focuses onto the sensor light reflected from the surface of material sample 101 to lens 104. As discussed above, the camera may also include an optical filter, e.g. a bandpass filter, disposed by lens assembly 109 between lens 104 and the optical sensor. The filter is configured to pass light at the selected predetermined wavelength range, as discussed above, to the sensor, whereas passed light includes at least a portion of the light wavelength range emitted by the illumination source. The bandpass filter may also limit the amount of light striking the sensor, which may prevent distortion of the resultant image caused by saturation of the optical sensor from light outside of the desired wavelength range, and may be included and used for this purpose even when the predetermined selected wavelength range is acquired by non-optical means.

As indicated above, the inspection system may also include a spectrometer 65, such as a reflectance spectrometer. As should be understood, spectrometers have the capability to measure light reflected from a surface and generate measurement data that can be output to a processor, memory, and/or user interface. Accordingly, the construction and general operation of such spectrometers is not discussed in further detail herein. In the example embodiment, the spectrometer outputs measurement data in real time via a suitable data cable 111 that connects to the processing circuitry 50, which, in turn, drives user interface 60 (FIG. 15) to display the data in a predetermined format for analysis by the operator.

Spectrometer 65 includes an inspection cable 110, which is shown in cross-section at detail B of FIG. 1. Inspection cable 110 comprises a plurality of fiber optic cables 112, 114. An input fiber 114 may be centrally located among the fiber optic cables and connected to a measurement input of spectrometer 65 so that input fiber 114 conveys light from the opposing distal end of cable 110 (proximate the surface of material sample 101) received by a lens (not shown) at the distal end and focused thereby onto fiber 114. The plurality of fiber optic cables of the inspection cable also includes a plurality of illumination fibers 112 disposed proximate to or in connection with an illumination source 68 (FIG. 15) housed in spectrometer 65. The illumination source may include one or more LEDs, or other suitable illumination source, configured to emit broadband light or light limited to a predetermined wavelength range (e.g. limited to or including the selected predetermined wavelength range as discussed above). In certain embodiments, the spectrometer may utilize an optical filter to limit the wavelength range of light directed to the spectrometer's light sensor, or the spectrometer can be programmed to analyze only the selected wavelength range even when receiving reflected light over a broader wavelength range, as described above. The spectrometer also houses a suitable lens system that conveys light from the light source to optical fibers 112 so that the illumination fibers convey the light from the illumination source to the inspection cable's distal end. The operator, or a fixed mount, holds the distal end proximate the surface of material sample 101 so that light emitted by fibers 112 is projected by a lens system at the distal end onto the surface of material sample 101 and reflects back to the above-described lens and thereby into fiber 114. The distal end may be positioned so that its face is perpendicular to the material sample 101, such that the spectrometer collects specular reflectance data. As discussed above, the distal end outputs the incident light from illumination fibers 112 (FIG. 1) centered about respective axes perpendicular to the generally planar face of the distal end. Thus, in such an orientation, the distal end outputs the incident light at one or more optical axes aligned at a 90° with respect to the oxide layer surface, assuming the oxide layer surface is generally planar. The incident light therefore reflects back to the input fiber 114 (FIG. 1) at an angle, e.g. 90 degrees from the surface of the sample that is also parallel to the fiber's optical axis, such that the angle of incidence (with respect to the oxide layer surface) of the light output by the fibers equals the angle of reflectance that is received by fiber 114. Alternatively, the distal end may be positioned at an angle other than perpendicular to the surface of the material sample, such that the spectrometer collects diffuse reflectance data. Since the angle of reflectance is not equal to the angle if incidence, the spectrometer is measuring scattered light from the surface of the material and/or oxide layer. As described below, specular reflectance data may be used to determine and analyze peak minima, such as arising from light reflected from thin films, whereas diffuse reflectance data may be used to identify changes in intensity, such as arising from light reflected from thick films.

Camera 64 and/or spectrometer 65 may be used to analyze the oxide layer on the surface of a sample material 101. In the example shown in detail C of FIG. 1, the sample 116 may be a zirconium alloy or other corrosion resistant material. The oxide layer 118, here zirconium oxide ($ZrO_2$), may be grown, as discussed above, as a thin film or thick film.

Referring to FIGS. 1 and 15, the method begins with the determination of the substrate material type of the sample, for example Zircaloy 2, Zircaloy 4, or the like. The material type may be determined by inspection of a manufacturer's description of the component or material, system diagrams, or other reliable source. In an instance in which the inspection system 40 (FIG. 15) is utilized, the user enters the material type via a user interface 60. The material type may be, for example, a material ID code (a code that corresponds directly to the material type) or a component ID code (a code that identifies the component part). Where component ID codes are used, processing circuitry 50 has a lookup table at 54 that correlates component ID codes with the material of which the components are made. When the user enters the component ID code, the processing circuitry references the lookup table to determine the material type for the designated component. The user may also enter an identifier that corresponds to the method of growing the film, e.g. natural, thin, or thick.

As discussed above, the expected or desired film thickness (that is, the oxide film thickness in absence of a defect) is known or determined in order to determine an illumination source with which to examine the oxide film. The expected or desired film thickness is based on the type of material upon which the oxide layer forms and, in some cases, the method of growing the oxide layer. The film thickness for a given material may be a known standard thickness that can be identified in a published reference table that correlates desired oxide film thickness with the material and/or method of growing the oxide layer or may be included in a manufacturer's specification. The expected film thickness may include a specific value and/or range determined by empirical testing. In some example embodiments, the manufacturer may determine or provide an expected oxide film thickness value and/or range for a given substrate material in conjunction with a manufacturing tolerance band, such as +/−1 percent, 5 percent, 10 percent, or the like, which may be used for determination of acceptability of the oxide film, as discussed below. In an instance in which inspection system 40 is utilized, the operator may enter, via user interface 60, the expected film thickness, or processing circuitry 50 may determine the expected or desired film thickness based on identification of the substrate material and/or the growth method entered as described above, such as by accessing a reference table stored in memory at 54. For instance, memory 54 may include a database that stores previously-determined expected oxide film thicknesses for each of a plurality of substrate material/film-growth methods. When the operator thereafter enters data identifying the substrate material and the film-growth method for the given material under test, the system selects the expected film thickness corresponding to the entered data pair from the database. The database also identifies the desired illumination source (e.g. in terms of wavelength range or the need to include at least a certain wavelength range) for each of a plurality of film thicknesses/material types. Thus, because the operator has entered the material type through the user interface, and the system has identified the expected film thickness based on the material and growth method, as described above, the processing circuitry then determines the illumination source by selecting from the lookup table in the database at 54 the illumination source corresponding to the expected film thickness and the material type.

As discussed above, the selection of the illumination source may equate to selecting a wavelength range that is desired from the light reflected from the oxide layer for purposes of analysis. Where the substrate material upon which the oxide layer is disposed is known and the method used to form the oxide layer (e.g. natural, thin film, or thick film formation) is known, the operator may select this wavelength range by first calculating a simulated reflectance spectra over a relatively broad wavelength range utilizing Fresnel equations (based on the expected substrate material and based on an assumption of the non-defect thickness of the oxide layer resulting from the known formation method). The creation of these simulations, for example utilizing Multiphysics simulation packages such as COMSOL MULTIPHYSICS available from Comsol, Inc. of Burlington, Mass., should be understood in this art in view of the present disclosure and are therefore not discussed in further detail. Given the simulated reference reflectance spectrum, the operator selects a subrange of the overall simulated reflectance spectrum range within which the reflectance spectrum can be expected to vary in a detectable and distinguishable manner that corresponds with variations in oxide layer thickness. Because layer thickness variations indicate oxide layer defects, the ability to detect and distinguish those variations in the spectral data within that wavelength subrange permits the system and the operator to identify such defects.

Figure 2:
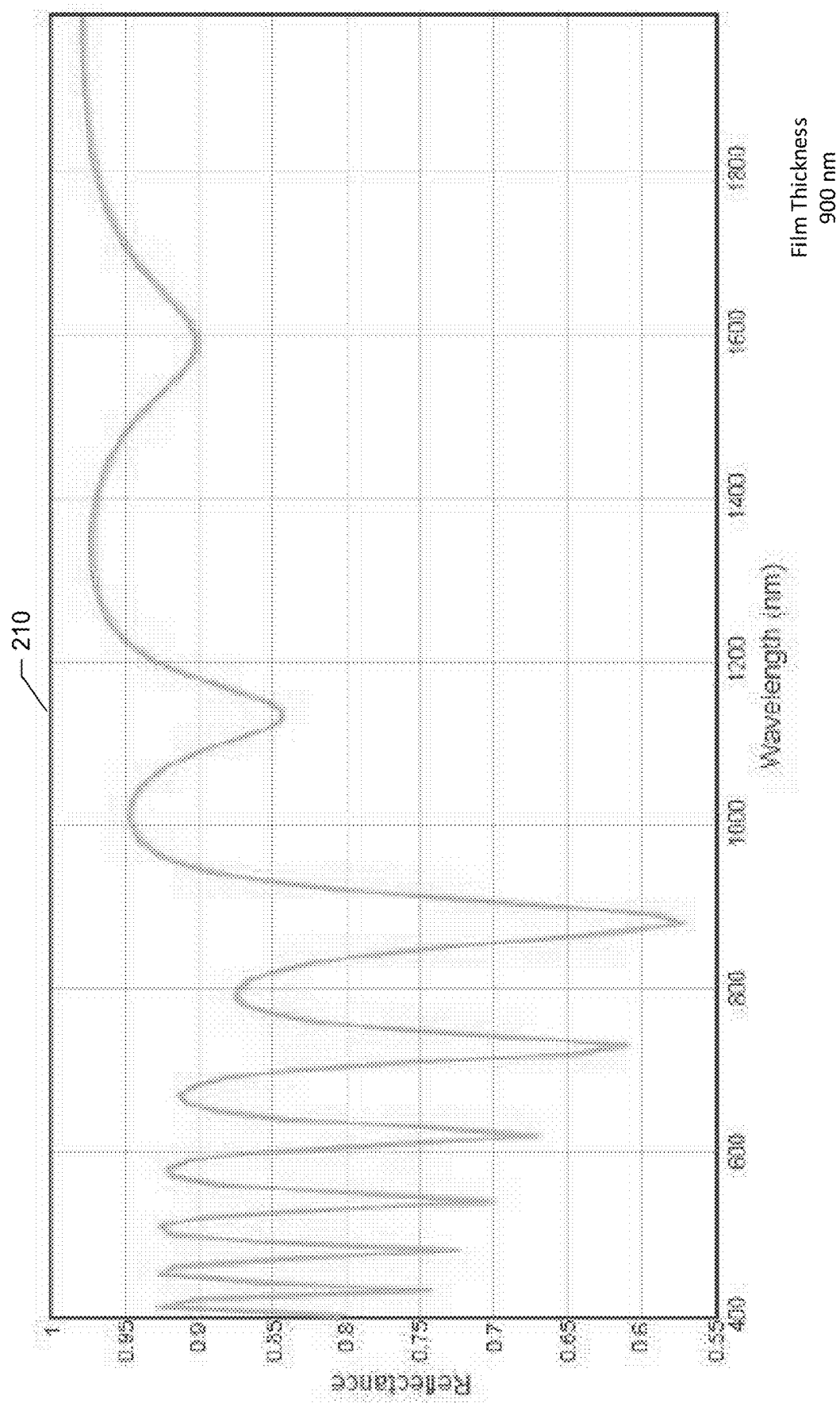
FIG. 2 is a graphical illustration of a simulated specular reflectance spectrum of a zirconia film.

FIG. 2 illustrates an example of such a simulated reflectance spectrum for a composite with a surface oxide layer having an expected oxide layer thickness of 900 nm. The simulated spectrum was produced by a reflectance model, or calculator, assuming an aluminum substrate. As should be understood, aluminum has relatively uniform reflectivity across the visible and near infrared (NIR) spectrum. In this sense, aluminum is similar to zirconium and, as such, can be generally utilized in the calibrations discussed herein to be used for testing of oxide films formed on zirconium test materials. That is, when aluminum and zirconium are used as substrates on which oxide films of the same thickness (which may be presumed when the same method is used to produce the oxide layer on both substrates) are disposed, the spectral responses (whether determined by a simulation model or by measurement of reflected light from an illumination source) of light reflected from the substrate/oxide layers of the two substrate/oxide layer composite combinations have a predetermined relationship with respect to each other that permits the system to rely on the spectral response of one such combination to be used as the reference spectrum for later actual measurements made with the other. In this instance, the predetermined relationship is that the spectral responses of the two combinations are effectively the same, but it should be understood that the system can accommodate variations between the spectral responses, e.g. converting a given measured spectral response of received light from one such combination according to the predetermined relationship to compare to the reference spectral response of the other combination. It should be understood, however, that other substrate alloys, e.g. zirconium, may be considered and modeled as described herein.

A broad wavelength range of 400 nm-2000 nm illustrates multiple wavelengths at which the specular reflectance spectra demonstrates minima relative to more consistent reflectance values. The visible part of the simulated spectrum has interference minima at 430, 480, 540, and 620 nm. The infrared portion of the spectrum, however, includes the deepest peak minimum, at 880 nm. In this example, the 880 nm minimum peak is approximately the same as the thickness of the film. As noted above, however, coincidence between the incident light and the film thickness does not always produce this result, and it should be understood that the primary peak minimum may occur at a wavelength significantly offset from the film thickness. Returning to the illustrated example, the operator may select a wavelength range that includes the expected peak minimum at 880 nm or at a wavelength for a different order minimum. To determine that range, the operator first examines the simulation for the expected (assuming no defects) specular reflectance spectrum over its broad wavelength range and selects a minimum peak that is sufficiently deep that it can be reliably distinguished from non-peak data and is sufficiently isolated from other minimum peaks that its shifts can be identified without confusion with positions of other minimum peaks. The discussion of the analysis of FIGS. 3A-3C below, assumes a wavelength range, selected as described herein, within which the predetermined minimum peak is expected to appear.

Figure 3A:
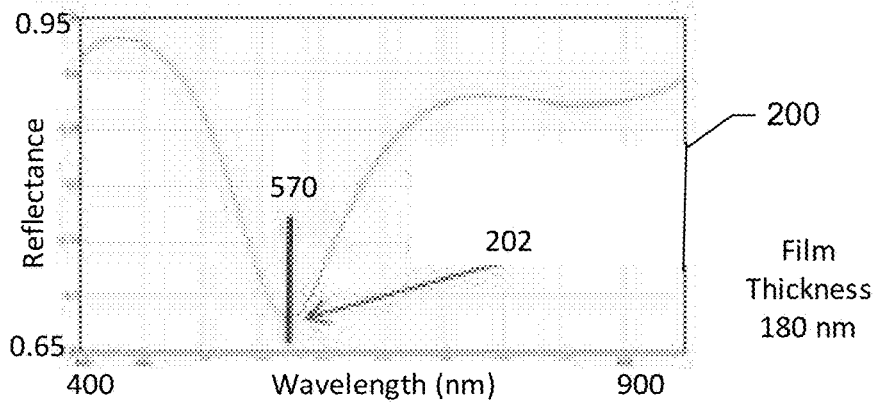
FIGS. 3A-3C are graphical illustrations of a series of simulated specular reflectance spectra of thin films on an aluminum substrate.
Figure 3B:
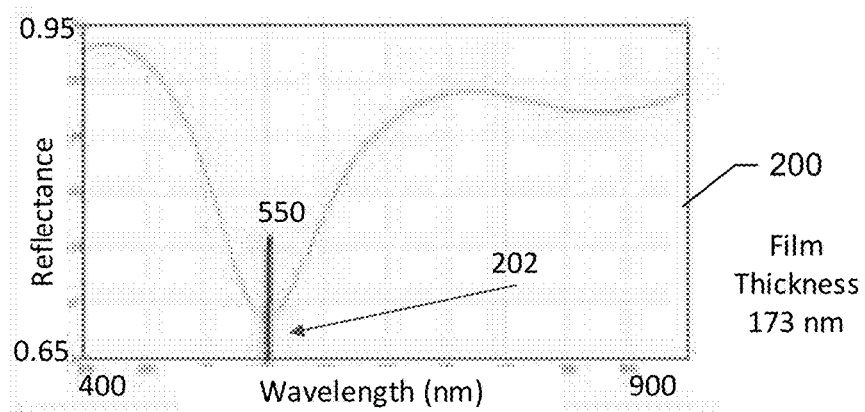
Figure 3C:
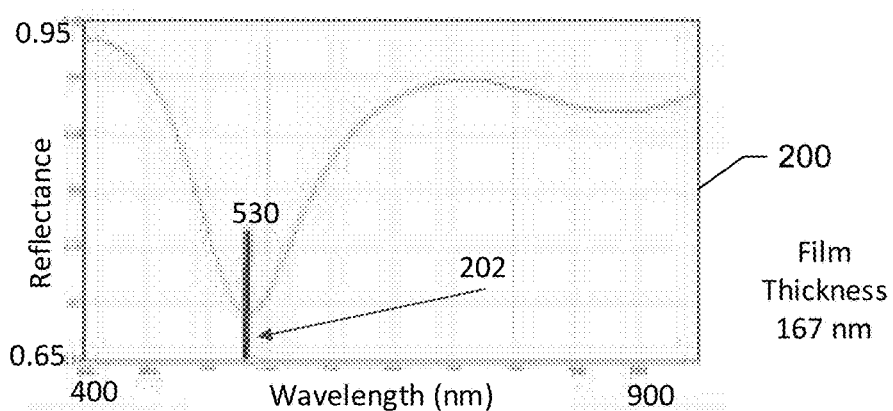

Accordingly, for example, the spectrographic analysis may be based on the detection of shifts in a local minimum, within such a selected wavelength range, within a reflectance spectrum from light reflected from a surface of the material under test. To illustrate how a spectrographic analysis can be used to determine presence of oxide film defects, which cause variations in film thickness at the defects' locations, FIGS. 3A-3C illustrate how the response of a substrate/oxide film can vary depending on film thickness. The figures illustrate a series of simulated specular reflectance spectra 200 of oxide films on an aluminum substrate over the wavelength range of about 400 nm to about 900 nm, which in this example is the wavelength subrange selected by the operator as described above with respect to FIG. 2. In the examples illustrated in FIGS. 3A-3C, the oxide film is thinner than the wavelength of visible light, i.e. about 390 nm to about 700 nm, but the primary peak minimum occurs within the visible spectrum.

FIG. 3A illustrates a minimum peak in a simulated reflectance spectrum of light reflected from an oxide layer that is about 180 nm thick, assuming no contaminant. The reflectance spectrum's subrange illustrated in FIG. 3A extends from 400 nm to 900 nm, and a minimum peak 202 occurs at 570 nm. FIG. 3B illustrates a simulated specular reflectance spectra 200 for light reflected from a 173 nm thick oxide film on an aluminum substrate. A similar minimum peak occurs, but the peak has shifted from 570 nm to 550 nm at 202. FIG. 3C illustrates that the minimum peak shifts to 530 nm when the oxide layer thickness reduces to 167 nm. Thus, FIGS. 3A-3C illustrate that the minimum peak's frequency varies in a manner that corresponds (in this instance, directly) to variation in oxide layer thickness. As thickness is a criteria by which the oxide layer's acceptability/defectiveness can be judged, detection of the wavelength at which a known minimum peak occurs, and comparison of that wavelength to a predetermined wavelength at which the minimum peak is expected to occur in the absence of a defect in the oxide layer, provides information indicating whether the area under test has an oxide layer defect.

The discussion above refers to "specular reflectance." As should be understood, "specular reflectance" refers to reflection of incident light by a surface into a single outgoing direction, and in particular to the proportion of incident light that is reflected in such manner, as opposed to being reflected in a diffuse reflection. For specular reflection to occur, the reflecting surface is mirror-like or the light source is aligned with respect to the surface so that the portion of the surface at which the light source's incident light is received behaves as a mirror and reflects the light at an angle that equals the light's angle of incidence. The appearance of a surface to the naked eye is more closely related to the diffuse reflectance, where the light is scattered from the surface in all directions. The specular and diffuse reflectance spectra are not identical but are closely related to each other. As such, spectral analysis of a film layer, based on specular reflectance, may reveal anomalies that are not apparent to the naked eye and its reliance on diffuse reflectance. As discussed herein, specular reflectance measurements are collected by positioning the distal end of the spectrometer light receiver at the end of the measurement cable perpendicular to the sample material 101, such that the angle of incidence equals the angle of reflectance. In contrast, diffuse reflectance measurements are collected by positioning the distal end of the spectrometer at a non-perpendicular angle relative to the surface of the sample material 101. Since, in the latter arrangement, the light is both emitted from and collected by fibers at the distal end of the spectrometer cable, the spectrometer only measures diffuse reflectance.

In some instances, the simulated specular reflectance spectrum for the oxide layer thickness/substrate material expected to be tested does not define a minimum peak useful for the wavelength-shift analysis reflected above in the discussion of FIGS. 3A-3C. Such examples are discussed below with respect to FIGS. 5-8. While minimum peak data may be unavailable, variations in oxide layer thickness can also cause shifts in the reflectance spectrum's intensity and/or shape. Accordingly, where the spectral simulation results in a spectrum that does not have a useful minimum peak, the operator may derive multiple additional simulations, both specular and diffuse, each representing an incremental change from the expected layer thickness (when no defects are present) and wherein the collection of simulations covers the range of oxide layer thickness variation expected to occur. Upon reviewing those simulated spectra, the operator looks for a single wavelength subrange within which each of the thickness-varied spectra defines a shape or intensity variation that is distinguishable, whether visually or automatically, from the defect-free simulated spectrum.

Having selected the wavelength sub-range, the operator enters data identifying the substrate and expected oxide layer thickness (which may be by identifying the method of forming the oxide layer) and the wavelength subrange's start and end wavelengths to processor 52 at user interface 60 (see FIGS. 1 and 15). The processor stores the wavelength subrange in association with the substrate/thickness (or formation method) combination. Thereafter, when the operator examines a test material that corresponds to a stored substrate/thickness (or formation) combination, the operator identifies the combination via the user interface before obtaining spectral data via spectrometer 65. Upon receiving the output data from the spectrometer, the processor selects that part of the data falling within the wavelength subrange stored for the identified combination in the database and displays the selected data to the operator at user interface 60, e.g. as illustrated with regard to the examples described with respect to FIGS. 5-8. In other embodiments, optical bandpass filters are utilized within the spectrometer system to pass the selected wavelength range within the light reflected from the sample and exclude wavelengths outside the selected band.

As is described herein, the operator may also examine output data from camera 64 in determining the presence or absence of oxide layer defects. As described below with regard to FIGS. 4 and 9-14, the operator may examine substrate/oxide layer calibration samples utilizing various different wavelength-restricted optical filters to receive broadband light reflected from the calibration samples, filter the reflected light to the filter's passband, and direct the filtered light to the camera's optical sensor. The camera's processor acquires the resulting image data and outputs the data to processing circuitry 50, which in turn drives a display at user interface 60 to display the resulting image. The operator, viewing such images, determines on a trial-and-error basis for each substrate/thickness (or formation method) combination which wavelength range (corresponding to a given optical filter used to filter the reflected light) provides the best visual contrast in the presence of thickness variations in the calibration samples. Again via the user interface, the operator identifies the wavelength range (e.g. in terms of an identification of a given optical filter) in association with the substrate/thickness combination for which the filter was selected. Thereafter, upon utilizing the system discussed herein to examine a test material corresponding to one of the combinations, the operator enters information to the processor, via the user interface, identifying the combination. The processor examines a lookup table at which the combinations are associated with the filter identifications, identifies the optical filter associated with the selected combination, and presents the filter's identity to the operator at the user interface. The operator then applies the identified optical filter to camera 64 (e.g. by installing a filter for the given wavelength range or adjusting an adjustable filter to pass the desired wavelength range) so that the camera receives broadband reflected light that is limited by that filter's pass band and presents images to the operator via the processor at the user interface that are thereby limited to the selected wavelength range. In other embodiments, after the operator informs the processor of the desired wavelength range determined through calibration, and the operator thereafter utilizes the system to examine a test material corresponding to one of the combinations using a broadband light source and enters information to the processor identifying the applicable substrate/thickness combination, the processor electronically filters the camera's output data to the wavelength range stored in the database for the identified combination before driving the user interface display with the camera output data.

In still further embodiments, the operator controls the wavelength range for the output data by selecting narrow-band illumination sources for the camera and spectrometer, where the illumination sources are limited to the desired wavelength range.

Accordingly, the material type and desired thickness being known, the desired illumination source, for example as defined by its capability of producing light at a desired wavelength value or range, may be determined based on a calculation-based and/or lab testing-based reference spectrum, trial and error, or the like, as discussed above. In some example embodiments, the wavelength range of the illumination source includes the expected thickness of the oxide film, for example, on zirconium, 400-700 nm for a thin film, 950-1650 nm for a thick film, or other suitable wavelength range. With this information, the operator assures that the light source(s) used in the system is limited to or contains the selected wavelength band range, e.g. through the use of optical filters applied to the reflected light or processing filters applied to the data corresponding to the reflected light.

Once the illumination source is determined, the operator positions the camera and/or the spectrometer and its/their corresponding light source(s) for inspection of a sample material under test. With continued reference to FIG. 1, in some embodiments, such as for use in laboratory testing, the camera and/or spectrometer may be mounted on a frame (not shown) relative to an inspection platform 103 so that the inspection platform is within the camera's (or the camera's optics') field of view and/or so that spectrometer cable 110 can reach and scan the surface of a composite sample 101 placed on the platform. The operator places composite sample 101 on platform 103 for inspection by camera 64 and/or spectrometer 65. The operator positions camera lens 104 or distal end of inspection cable 110 at one or more inspection areas to capture camera data and/or measurement data.

In embodiments in which one or more components are being inspected in place within a larger device or system, such as during installation, repair, welding, or the like, the operator may dispose camera 64 and/or spectrometer 65 to view one or more inspection areas on the material. Camera 64 and/or spectrometer 65 may be mounted on an adjustable arm that maintains a position of camera 64 and/or spectrometer 65 fixed relative to the arm, but allows movement of the arm to thereby position the camera or spectrometer with respect to the sample under test during collection of camera data or measurement data and then may be repositioned by the operator. Alternatively, camera 64 and/or spectrometer 65 may be hand-held, such that the operator holds camera 64 and/or spectrometer 65 in a position while collecting the camera data or measurement data. In either case, camera 64 and/or spectrometer 65 may output camera data and measurement data in real time to processing circuitry 50. In some example embodiments, the camera and/or spectrometer are operated without wired connection with the processing circuitry but are later connected to the processing circuitry by wired or wireless connection to download the data. The camera data and/or measurement data may be temporarily stored at the camera 64 and/or spectrometer 65 in a local memory for later analysis and/or processing by processing circuitry 50.

As discussed in further detail below, the method includes the use of one or both of two analysis components, e.g. the camera and the spectrometer. The selection to use one or both of the analysis components may be based on the accessibility of the material surface and/or quality assurance requirements associated with the sample. In some cases, for example when examining a new, as yet uninstalled, component, composite 101 (the component) is fully accessible by the camera's field of view, and the operator may use camera 64 to perform the inspection without use of the spectrometer. In other cases, e.g. where the portion of composite surface cannot be put within the camera's field of view but is accessible to the spectrometer cable or where, even if the material surface is entirely within the camera's field of view, a more thorough inspection is needed to examine abnormalities detected in the camera image or if required by quality assurance requirements, such as in certifying a weld, the operator may use both camera 64 and spectrometer 65 for an inspection. In still further examples, the size of camera 64 may prevent the camera from being positioned to view the inspection area, or in determining the desired illumination source it is found that the best wavelength range is wholly or partly outside the human-visible range, and the operator utilizes spectrometer 65 to perform the inspection without concurrent use of the camera.

The selected illumination source illuminates the inspection area under observation. An inspection area may be any predefined area of the composite sample, such as one or more operator defined areas of a machine, vessel, or container surface. In some instances, quality assurance inspection requirements may dictate the number and/or location of inspection areas on a composite sample. In some embodiments, the inspection area may be associated with a particular feature of the composite sample, such as a weld, joint, or the like, the location of which is known beforehand or is identifiable immediately upon visual inspection, so that the operator selects the inspection area simply by identifying the feature's location. Where the analysis will include the camera, the operator positions the camera (manually or via movement of a frame upon which the camera is disposed, as discussed above) with respect to the desired area in an attempt to locate the desired sample area within the camera's field of view. The operator or, if utilized, processing circuitry 50 activates the camera, and the camera outputs its data to the user interface, which displays the real time camera output image on the user interface screen. The operator views the screen and determines whether the desired/intended inspection area is, in fact, within the camera image (the camera's field of view). Where the operator is using the processing circuitry, the operator may enter an instruction via the user interface to confirm to the processing circuitry that the desired inspection area is within the camera field of view. If the desired inspection area is not within the camera field of view, the operator moves the camera in a direction the operator believes should bring the camera's field of view to encompass the desired area, and the process repeats until the operator has analyzed all desired areas of the material surface under test and enters an instruction to processing circuitry 50 that the test has concluded.

If the operator or the processing circuitry confirms that the inspection area is within the camera image, the operator and/or inspection system 40 then determines if any high contrast area or regions are visible in the inspection area. The high contrast area is defined by a wavelength transition in light reflected from the surface that exceeds a predetermined threshold level and may appear, for example, as an area of glare against a duller area, a color transition, a transition between shadow and light, or the like in the camera image indicating that the structure of the oxide layer is different than the surrounding oxide layer. Some example camera images including high contrast areas are discussed in further detail below in reference to FIGS. 9-13. In some embodiments, the operator determines the presence of one or more high contrast areas entirely manually, by observing the image data from camera 64 that the system provides at the display of user interface 60 (FIG. 15). In another, the operator visually inspects the image information presented at the user interface display and, upon so identifying one or more possible high contrast areas, then performs a survey of the identified areas using spectrometer 65. Additionally or alternatively, processing circuitry 50 may analyze the entire image acquired by camera 64 and transmitted to the processing circuitry to automatically determine high contrast areas or indicate to the operator (through information driven to the user interface display) areas in the image for the operator's further analysis, e.g. utilizing the spectrometer. In one such embodiment, processing circuitry 50 applies machine vision or object detection image processing techniques to determine the one or more high contrast areas. For example, processing circuitry 50 may be configured to apply an image processing method, such as stitching and registration, morphologic filtering, thresholding, pixel counting, segmentation, edge detection, color analysis, blob detection, pattern recognition, or the like, to identify one or more high contrast areas in the camera image. Additionally or alternatively, processing circuitry 50 may be configured to apply other image processing techniques including recognition of common shapes (for example, metallurgical grains), recognition of "contrasted" shapes that are different from the majority of shapes, "false color" enhancement to identify features that have contrast, unusual shape, and/or other specified features. For example, processing circuitry 50 may be configured to determine an average grey scale pixel value over the image, determine the difference between the value of each pixel and the average, and determine the average difference over a predetermined area of such pixels, shifting the area over the image surface on a pixel or other basis until the entire image is assessed. If the difference value for any such area within the image is greater than a predetermined threshold (determined, for example, from calibration testing of surfaces having known defects), the processing circuitry associates an indicator in the database at 54 with the area's pixels, identifying that area as potentially containing an oxide layer defect.

During a manual inspection, the operator may note the location of the high contrast area appearing in the common output shown at the user interface display, such as by making a mark on a sample map or on the sample itself, or by other suitable method. During an automated inspection as described herein, the processing circuitry 50 may annotate the image data with the location of a high contrast area within the image. In some example embodiments, the user may identify one or more locations within an image and either a distance between the camera and sample material or a pixel/area value. The processing circuitry 50 may determine a location of the high contrast area for further inspection, including but not limited to spectrographic inspection, based on the locations within the image and/or the pixel/area value.

In some example embodiments, processing circuitry 50 may be configured to apply light compensation to the image data received from the camera to provide increased detail for analysis for identifying high contrast areas. In an example embodiment, the light compensation includes applying a gamma filter, such as a two-pass gamma filter, to the received data. The two-pass gamma filter may be applied to a camera image data at a high gamma correction and again at a low gamma correction. Having applied each of the high gamma correction and low gamma correction to the data, thereby resulting in two image sets, the processor adds the high gamma compensated camera image to the low gamma compensated camera image, or adds both the high gamma compensated image and the low gamma compensated image to the original camera image, to achieve a final compensated image. The high gamma compensated camera image and the low gamma camera image may highlight different areas of the original image data due to the differences in reflectance, thus enabling further details in the image data to be detected for identification of high contrast areas. The parameters for the gamma filters may be determined based on one or more calculations utilizing frequency response simulators, lab testing, and/or trial and error.

In an instance in which the material 101 is being inspected on the inspection platform 103, the operator or processing circuitry 50 may cause positioning motors 66 to pivotally or otherwise move inspection platform 103 to thereby change the angle of the inspection platform 103 relative to the lens axis of camera 64, thereby changing the angle of a generally planar surface of the material relative to the optical axis of camera 64 from a right angle. Additionally or alternatively, the operator or processing circuitry 50 may cause positioning motors to move camera 64 so that the angle of the camera 64 optical axis relative to the surface of composite 101 changes from 90°. The degree to which processing circuitry 50 causes the one or more positioning motors to move the camera and/or inspection plate is defined in response to operator input via the user interface. The change in angle may be 1 degree, 3 degrees, 5 degrees, 10 degrees, or any other suitable change in angle, and the change may be made in incremental steps or continuously. The change in angle may cause a glare or other reflective anomaly, e.g. high contrast area, to be more easily perceived in the image due to the change in reflectance of the oxide layer, such as due to an abnormal film thickness or contamination.

As noted above, the operator or the processing circuitry 50 may perform the spectral analysis of composite 101 using spectrometer 65. The operator may perform the spectral analysis, for example, when camera 64, and particularly its field of view, is unable to access the inspection area, when the operator has visually identified one or more high contrast areas within the camera image data acquired by camera 64 and displayed on the user interface display and wishes to utilize the spectrometer to confirm the visual assessment, or simply as part of a procedure whereby the operator uses the spectrograph to assess the one or more portions of the test surface area, regardless whether the operator also relies on the camera image.

The operator or the processing system positions the distal end of inspection cable 110 at the inspection area. In an example in which the processing circuitry 50 controls the position of the inspection cable, the inspection cable may include motorized joints, including positioning motors that drive rollers that interface between the face of the inspection cable and the test surface so that driving the rollers moves the inspection cable on the test surface. In other embodiments, the system includes a plurality of guide cables attached to the inspection cable head as it is disposed operatively on the test surface and extending through respective openings in a perimeter structure extending about the inspection cable head. A respective positioning motor is attached to a given pair of cables, so that operating the positioning motor in one direction pulls one cable and allows the other to reel out. Since the two cables are attached at opposite ends or sides of the inspection cable head, this causes the inspection cable head to move in a direction from the inspection cable head toward the point at which the pulling cable extends through the perimeter. Actuation of the positioning motor in the opposite direction causes the reverse function and the inspection cable head's movement in the opposite direction. Each pair of cables attaches to the inspection cable head, and extends through the perimeter, at an angularly offset position with respect to the next two adjacent cable pairs, so that the inspection cable head can be moved generally in any direction by selecting the correct cable pair and actuating the corresponding positioning motor in the correct direction. In other embodiments, the wire guides are replaced by screw drives or other mechanical, electrical, hydraulic, or pneumatic linear actuator may be used. In such arrangements, the processor is in operative communication with the positioning motor(s) so that, in response to the operator's directional and distance instruction provided via user interface 60 (FIG. 15), the processing circuitry's programming is configured to cause the processor to actuate one or more of the positioning motors to move the inspection cable to a desired inspection area. In some example embodiments, the inspection cable may be restrained in a mounting block configured to maintain the inspection cable at a fixed position relative to the surface of sample 101. The positioning motors may be configured to move the mounting block to position the inspection cable to the desired inspection area. Alternatively, the inspection cable 110 may be moved by hand and held at the desired inspection by either the operator's hand or the mounting block during a measurement. The surface of the test sample may be planer, curved, or of other shapes.

As discussed above, spectrometer 65 includes a light source (e.g. a series of LEDs, incandescent bulbs, other broadband illumination with few spectral features, or the like) that generates light applied to the illumination fibers 112 so that the fibers carry the light to the distal end of cable 110. This light outputs from the cable distal end and reflects from the surface of test material 101. The end of input fiber 114 at the distal end of cable 110 receives light reflected from the surface of the material and carries the received light back to the spectrometer processing equipment. In response, spectrometer 65 determines, and generates corresponding measurement data of, the reflectance of the material over the wavelength range of the illumination source's generated light or the wavelength range selected as described above, e.g. as provided by the manufacturer of the substrate material, such as illustrated in FIGS. 3A-3C. That is, the processor of spectrometer 65 generates the reflectance spectrum of the received light. Spectrometer 65 outputs the spectrum data to processing circuitry 50 (FIG. 1) and more specifically to processor 52 (FIG. 15), which stores the spectrum at memory 54 and drives display of the spectrum at the display of user interface 62 (FIG. 15). The operator may position the inspection cable 110 and take measurements at one or more points in the inspection area, surveying a plurality of locations within the inspection area, e.g. making a measurement per millimeter, a measurement per centimeter, or measurements at other suitable measurement densities. In some examples, and particularly where the operator moves the cable distal end continuously over a surface of the sample, the processing circuitry may present the measurement data at user interface 62 (FIG. 15) overlaid in one or more measurement graphs to illustrate the spectral response as it varies across the sample surface and, thereby, facilitate the identification of deviations in that spectral response. Example measurement data stacking or overlay is depicted in the examples discussed below in reference to FIGS. 5-8. Still further, the operator may move the cable end over selected areas of the sample that have been predetermined to have a likelihood of inclusion of an oxide layer defect.

In an example embodiment, processing circuitry 50 may track the position of each measurement in the inspection area. For example, the positioning motors, e.g. stepper motors, may include, or be associated with, a linear encoder configured to determine the change in position in one or more axes based on operation of the positioning motors. The operator may position the inspection cable at a first known position within the inspection area (for example a position physically marked by the operator on the component under test), which is assumed to be a two dimensional surface that may (or may not, depending on the embodiment) correspond to a predetermined Cartesian-coordinate map stored by the processing circuitry. At that position, the operator interacts with the spectrometer directly or through the user interface, causing the spectrometer light source to activate and thereby illuminate the first known position with light from the light source that is emitted from the cable distal end. That light reflects from the sample surface into the centrally located input fiber 114 (FIG. 1), which directs the light to the spectrometer, which produces a spectral resonance v. wavelength data set, e.g. as illustrated in FIGS. 3A-3C or FIGS. 5-8. The operator and/or processing circuitry 50 then drives the inspection cable end to the next incremental position or, depending on the particular application, to the next survey position in the same inspection area, causing the inspection cable and spectrometer to then acquire a new spectral reflectance data set in a similar manner. Repeating this process thereby causes the processing circuitry to acquire a plurality of data sets that can be simultaneously displayed at the user interface screen as in FIGS. 5-8. Processing circuitry 50 determines the current position of each of the measurements based on encoder data indicating operation of the positioning motors and the first known position. In some example embodiments, processing circuitry 50 may cause diffuse reflectance data to be collected at each survey position by positioning the distal end of the spectrometer cable at a non-perpendicular angle relative to the surface of the sample material.

Once the inspection area has been surveyed utilizing the spectrometer, the operator or processing circuitry 50 analyzes the reflectance spectrum data for the measurement at each measurement position to determine whether the reflectance spectrum at a given position differs sufficiently from the reflectance spectrum expected if the oxide layer has no defects over the selected wavelength range that a defect will be found to exist. The measurement may be taken either in the specular or diffuse reflectance spectra, depending on the calibration for the specific material, film, and expected defects. An area of concern may be identified, for example, if there is any one measurement that falls outside predetermined criteria for acceptance or if a measurement reflectance spectrum calculated as an average spectrum of a plurality of a measurements at the same or closely-positioned locations falls outside the predetermined criteria. It should be understood that a single measured reflectance spectrum, as well as an average or other consolidation of a plurality of measured reflectance spectra at the same or closely-positioned locations, can comprise a measurement spectrum as that term is used herein.

As discussed further below in reference to the examples depicted in FIGS. 5-8, to determine whether a measurement reflectance spectrum (whether resulting from a single spectrometer measurement or an average or other collection of multiple measurements) falls within or outside the predetermined criteria, the operator or processing circuitry 50 may visually or automatically compare the actual measurement reflectance spectrum with a reference spectrum over a wavelength range determined as discussed above. The comparison may be based, for example, upon differences in shape and location of the measurement reflectance spectrum as compared to the reference reflectance spectrum or upon differences in discrete characteristics of the measurement and reference spectra, e.g. their specific minima and peak intensities.

In such embodiments, the analysis relies on an expected, or reference, spectrum against which to compare the measurement spectrum. This, in turn, relies on the definition of the reference spectrum. The reference spectrum may be, e.g., a plurality of discrete, actual spectrographic measurements (see FIGS. 5-8) of the material that is under test or of one or more samples of a material and oxide layer growth method that is the same as or equivalent to (or that has a predetermined relationship to, with respect to the spectral response, as described above) the composite material under test, or an average or other form of consolidation of such a plurality of such discrete, actual measurements, where the material under test or calibration samples from which such measurements are made is/are known to have no defects affecting the thickness of the oxide layer or it is otherwise known that the oxide layer thickness of the material under test or calibration samples from which such measurements are made is at a predetermined expected value. Alternatively, the operator may determine the reference spectrum through calculation models as described above, under assumptions of the substrate material and oxide layer growth method/thickness that are the same as or equivalent to the material and oxide layer under test. Still further, the reference spectrum may comprise data provided by the manufacturer of the material under test or of equivalent (in terms of oxide layer thickness and reflectance) material. For example, the operator may use the system to generate the expected measurement data by making a plurality of measurements with the spectrometer at a plurality of discrete locations over a wide area of the surface of the material under test and acquiring the reflectance spectra for those measurements over the predetermined wavelength range (determined as discussed above). The collection of the resulting reflectance spectrum, when viewed by the operator at the display of user interface 60, may comprise one or more reflectance spectra having similar shapes, wavelength locations, and intensities that result from measurements taken at positions on the test material at which the oxide layer thickness is at its expected value (the reference, or normal, spectra), with another one or more spectra (if any) being distinguishingly different in shape, wavelength location (e.g. of peak minima), and/or intensity (the abnormal spectra). When viewing the display, the operator may make the distinction between the normal spectra and the abnormal spectra based on the operator's judgment and experience in assessing measurements of similar composite material. Often, for instance, there may be a greater number of normal spectra than abnormal spectra, such that the operator may determine the majority of spectra with similar shape, wavelength location, and/or intensity to be the reference spectrum. Again, the reference spectrum may comprise the collection of these normal spectra, or the operator may average those normal spectra, for example by selecting the plurality of normal spectra and executing an averaging routine (via instruction provided through the user interface) by the processing circuitry. Alternatively, the operator may create an oxide film on the same or equivalent substrate as the material under test and by the same or equivalent method as the oxide layer is formed on the material under test, examine the sample composite material under laboratory conditions and confirm that no defects are present or otherwise that the oxide layer thickness is as expected, make a plurality of spectrographic measurements at different locations on that calibration sample material, and similarly determine a reference reflectance spectrum. In other embodiments, the manufacturer of the material under test may provide a reference reflectance spectrum over a wavelength range selected by the manufacturer. In a still further embodiment, the operator calculates a reference spectrum, minimum peak wavelength and minimum peak intensity (or minimum peak wavelength and minimum peak intensity without determining the reference spectrum itself) over a wavelength range determined as discussed above using a computer program model under assumed conditions (e.g. substrate material and oxide layer growth method) that are the same as the material under test. Such reference spectra can be created through application of Fresnel equations and such conditions. The operator may also enter data describing a reference spectrum via the user interface.

The operator, having caused the system to determine the reference measurement data or having provided manufacturer-generated reference measurement data to the processing circuitry through the user interface or a data transfer interface, provides an instruction to processing circuitry 50 (FIGS. 1 and 15) to store the reference spectra, and processing circuitry 50 stores each reference spectra data in association with the substrate material and oxide layer thickness, which may be defined as the film growth method to which it corresponds, for purposes of comparison with actual test surface measurements as discussed herein.

Upon utilizing spectrometer 65 to acquire a reflectance spectrum of a position on the test material surface, the operator utilizes system 40 to determine whether the acquired actual measurement spectrum deviates sufficiently from the expected, or reference, reflectance spectrum corresponding to the same substrate material and film growth method as the material under test to thereby identify a defect in the test material's oxide layer at that position. For example, the processing circuitry may display at user interface 60 the measurement spectrum overlaid upon the reference spectrum for the same substrate material and film growth method as applicable to the test material, such that the operator visually compares the measurement and reference spectra to determine, e.g. based on experience, whether the measurement spectrum's deviation from the reference spectrum (e.g. in spectrum shape, intensity, and/or peak minimum wavelength location) corresponds to an oxide layer defect. Upon so determining the presence of a defect through visual inspection, the operator actuates the user interface to select an indication of the defect's presence, thereby causing the user interface to send corresponding data to processing circuitry 50, which associates the defect choice with the measurement spectrum (e.g. including the measurement spectrum's location on the sample surface, as discussed above) in system memory. If the measurement spectrum is, in the operator's judgment, sufficiently close to the reference spectrum (e.g. in shape, intensity, and/or peak minimum wavelength location) to indicate absence of a defect, the operator actuates the user interface to indicate absence of a defect, causing the user interface to send a corresponding signal to the processing circuitry, which stores that result in association with the measurement spectrum in system memory. Alternatively, or in addition, processor 52 may execute a curve matching algorithm, for example including but not limited to mean square deviation, principle component analysis, and peak fitting algorithms, to quantitatively assess differences between the measurement and reference spectra (e.g. in shape, wavelength position, and/or intensity), identifying an oxide layer defect when the difference exceeds a predetermined threshold determined through testing. Upon reaching a conclusion for the presence or absence of a defect through such automated means, the processing circuitry stores the resulting conclusion in association with the measurement spectrum in memory.

For example, where a specular reference spectrum and a specular measurement spectrum demonstrate a minimum peak wavelength shift as discussed above with respect to FIGS. 3A-3C, the operator may mark (e.g. using a system/user interface input device such as a mouse, keyboard, or touchscreen) the minimum peak on the reference spectrum image and the minimum peak on the actual measurement spectrum image. This identifies the wavelength locations of the minimum peaks and causes the user interface to forward corresponding data (i.e. the wavelength identified by the user through the user interface) to processing circuitry 50/processor 52. The processor determines the wavelength difference between these two identified peaks and displays that difference on the user interface display. The operator may then determine, based on the operator's judgment and/or experience, whether that difference indicates a thickness variation indicative of an oxide layer defect. Alternatively, where the operator has previously determined a wavelength shift threshold applicable to this substrate/layer thickness (e.g. by formation method) combination that is stored at memory 54, the processor compares the calculated wavelength shift with the stored threshold wavelength shift corresponding to the applicable combination and determines whether the measured wavelength shift is beyond the threshold, thereby indicating a defect, or is within the threshold, thereby indicating absence of a defect. The processing circuitry drives the user interface to display information identifying the result. Still further, where the step of determining the reference spectrum discussed above includes identifying a minimum peak for a specular reference spectrum (e.g. by visual operator identification and manual operator input into the system, automatic identification by processor 52 by a peak-finding algorithm applied to the reference spectrum, or receipt of reference spectrum peak identification data from the substrate material manufacturer and input into the system) and storing the reference spectrum minimum peak in association with the substrate/layer thickness combination record at 54, and where the operator has previously determined a wavelength shift threshold applicable to this combination that is stored in memory at 54 in association with the applicable combination record, the processor executes a (minimum) peak identification algorithm against the specular measurement spectrum (within the selected, or predetermined, wavelength range) that automatically identifies the measurement spectrum's minimum peak, compares the calculated minimum peak wavelength with the predetermined reference spectrum minimum peak wavelength, and determines the wavelength difference between the two. The processor compares the calculated wavelength shift with the threshold corresponding to the applicable combination and determines whether the wavelength shift is beyond the threshold, thereby indicating a defect, or is within the threshold, thereby indicating absence of a defect. The processing circuitry drives the user interface to display information identifying the result.

Where the operator determines the existence of a defect subjectively, the operator enters information identifying this decision to the processor via the user interface. As noted, the processor stores data indicating the existence of the defect in the data record that stores the measurement spectrum for and location (on the material surface under test) of the corresponding measurement at 54 to allow the operator to later identify the defect's location for further analysis and possible repair. Where the processor determines the defect's existence automatically, the processor automatically stores corresponding information with the measurement's data record at 54.

Similarly, where the difference between the reference spectrum (either specular or diffuse) and the measurement spectrum (either specular or diffuse, but of the same type as the reference spectrum) is primarily a shift in reflectance intensity over the selected wavelength range, the operator may mark a point on the reference spectrum image and a point on the actual measurement spectrum image, the difference between which the operator judges to be indicative of the intensity shift between the spectra. This identifies intensity locations of the reference and measurement spectra and causes the user interface to forward corresponding data to processing circuitry 50/processor 52. The processor determines the intensity difference between the two selected positions and displays that difference on the user interface display. The operator may then determine, based on the operator's judgment and/or experience, whether that difference indicates a thickness variation indicative of an oxide layer defect. Alternatively, where the operator has previously determined an intensity shift threshold applicable to this substrate/layer thickness (or formation method) combination that is stored at memory 54, the processor compares the calculated intensity shift with the threshold corresponding to the applicable combination and determines whether the intensity shift is beyond the threshold, thereby indicating a defect, or is within the threshold, thereby indicating absence of a defect. The processing circuitry drives the user interface to display information identifying the result. Still further, where the step of determining the reference spectrum discussed above includes identifying a reflectance intensity for the reference spectrum (e.g. by visual operator identification and manual operator input into the system, automatic identification by processor 52 by an averaging algorithm applied to the reference spectrum over the predetermined wavelength range, or receipt of reference spectrum average reflectance intensity data from the substrate material manufacturer and input into the system) and storing the reference spectrum intensity in association with the substrate/layer thickness combination record at 54, and where the operator has previously determined a reflectance intensity threshold applicable to this combination that is stored in memory at 54 in association with the applicable combination record, the processor executes a reflectance intensity averaging algorithm against the measurement spectrum (within the selected, or predetermined, wavelength range) that automatically identifies the measurement spectrum's intensity, compares the calculated intensity with the predetermined reference spectrum intensity, and determines the intensity difference between the two. The processor compares the calculated intensity difference with the threshold corresponding to the applicable combination and determines whether the intensity difference is beyond the threshold, thereby indicating a defect, or is within the threshold, thereby indicating absence of a defect. The processing circuitry drives the user interface to display information identifying the result.

Where the operator determines the existence of a defect subjectively, the operator enters information identifying this decision to the processor via the user interface. The processor stores data indicating the existence of the defect in the data record that stores the measurement spectrum for and location (on the material surface under test) of the corresponding measurement at 54 to allow the operator to later identify the defect's location for further analysis and possible repair. Where the processor determines the defect's existence automatically, the processor automatically stores corresponding information with the measurement's data record at 54

A measurement spectrum's minimum peak wavelength shift or intensity shift may be either higher or lower than the reference spectrum's minimum peak wavelength or reflectance intensity. Such a high or low deviation may be identified as an oxide film defect when it is about or exceeds at least one standard deviation from the reference spectrum value, as determined by the plurality of calibration reflectance spectra used to comprise the reference reflectance spectra as described above. Other thresholds may be defined, for example more than one standard deviation, or a difference in wavelength shift defined in terms of wavelength, or a difference in intensity defined in terms of reflectance, each defined through testing of sample materials made from the same material as the test material and having oxide layers grown in the same manner as the oxide film on the test material. Further, the threshold for low wavelength shift may be different from the threshold for high wavelength shift, and the threshold for low intensity shift may be different from the threshold for high intensity shift, based on such testing. Still further, the threshold for comparison, for any of the above-described methods, may be provided by the manufacturer of the material under test. The aforementioned methods of comparing the measurement minimum wavelength to the reference minimum wavelength, the measurement intensity to the reference intensity, and/or the measurement reflectance spectrum shape to the reference reflectance spectrum shape are merely for illustrative purposes, and one of ordinary skill in the art would appreciate that other suitable methods may be substituted as appropriate. The described analysis may be performed dynamically during the inspection or may be performed after one or more measurements.

Based on the camera image analysis and/or the spectral analysis, the operator and/or the processing circuitry may determine the general acceptability of the oxide layer of the composite material under test. The acceptability may be based on one or more acceptance criteria, including without limitation, no camera image (or no more than a predetermined percentage of camera images) having a high contrast areas, no measurement (or no more than a predetermined percentage of measurements) having below a predetermined minimum peak wavelength or above a predetermined minimum peak wavelength, no measurement (or no more than a predetermined percentage of measurements) having below a predetermined intensity or above a predetermined intensity, no measurement (or no more than a predetermined percentage of measurements) having a maximum deviation from an expected minimum peak wavelength, a maximum deviation from an expected intensity, or a maximum deviation from an expected film thickness (including a thickness range) based on a measured minimum peak wavelength or peak intensity, a lack of contamination of the oxide layer, a lack of a certain predetermined contaminant in the oxide layer, or other suitable criteria. As discussed above, processor 52 saves in memory 54 data describing the relevant criteria for each spectroscopy measurement, along with an identification of the test surface upon which the measurements were made. When the operator completes the measurements for the surface under test, the operator enters data through the user interface indicating to processor 52 that the inspection is complete. Processor 52 then assesses all measurements records stored in memory 54 for the test material, determines whether any of one or more of the criteria described above exists as defined by those records, and displays at user interface 60 whether the test surface is or is not acceptable based on that criteria. The acceptability may be a pass/fail indication, include the acceptable criteria, such as an oxide film thickness, and/or observations of the material 101, or other suitable report or readout.

In an instance in which composite material 101 is determined to be acceptable, composite material 101 may be installed or used in the predetermined application, such as cladding in nuclear applications, steam system components, or other corrosion resistance critical applications.

Figure 4:
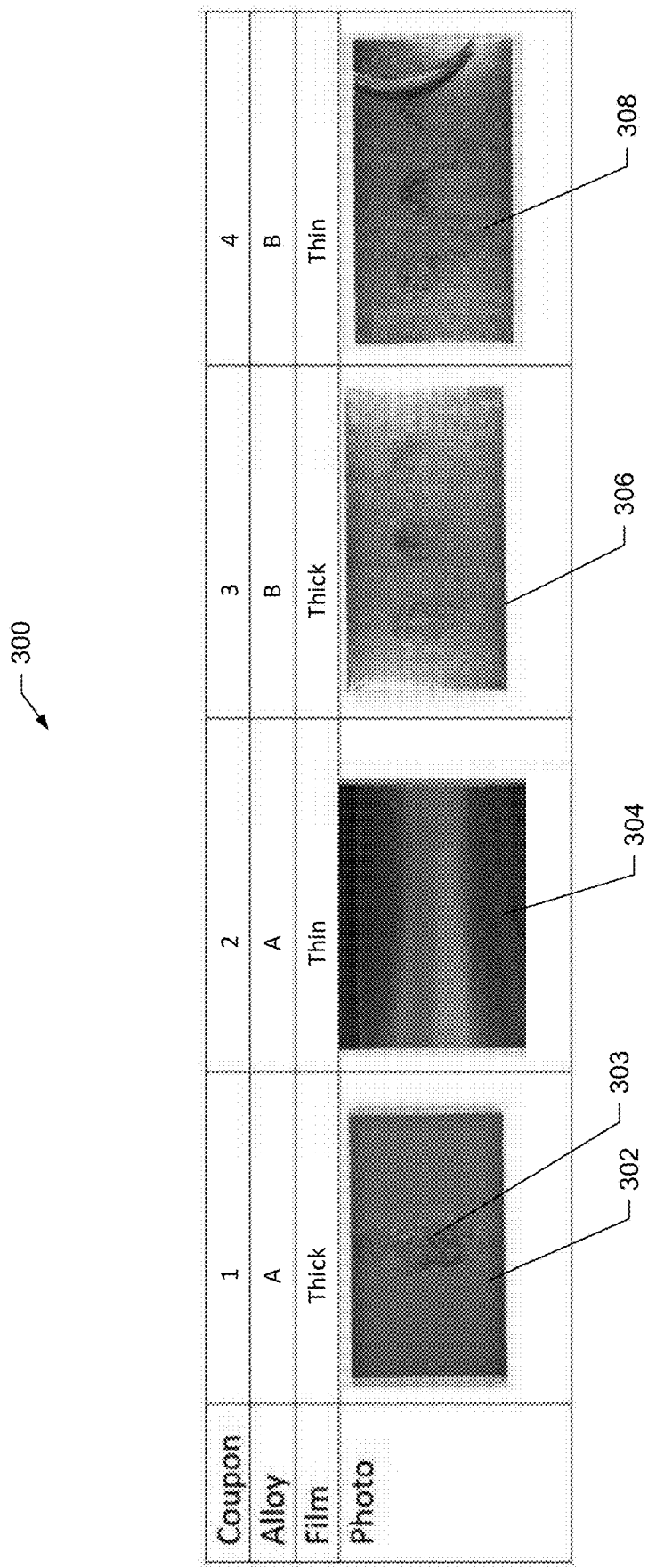
FIG. 4 is a graphical illustration of images of sample composite coupons acquired by a digital camera.

FIGS. 4-16 illustrate example materials undergoing both camera image and spectral analysis with illumination sources selected according to processes described above. FIG. 4 illustrates four example composite material coupons 300. A first coupon 302 is identified as 1; alloy A, thick film and includes a weld 303. A second coupon 304 is identified as 2; alloy A, thin film. A third coupon 306 is identified as 3; alloy B, thick film. A fourth coupon 308 is identified as 4; alloy B, thin film. Each coupon comprises either of two zirconium alloys A or B as substrates upon which an oxide layer has grown. FIG. 4 illustrates images of these coupons acquired by a camera in the visible spectrum, while FIGS. 9-13 depict images of these same coupons acquired by a SWIR camera comprising a component of a system as described herein and indicated at 64 (FIGS. 1 and 15) using a variety of lenses and light sources. Most imaging conditions provided adequate contrast, when the acquired images are viewed on a display as at 60 (FIG. 15), to indicate the tungsten contaminated areas in the coupons with thick film. Thin film inspection with the SWIR camera, in some cases, caused minimal or no detectable contrast between the normal thin film and abnormal thin film. As such, specular reflectance spectrum analysis, for example utilizing a spectrometer as at 65 (FIGS. 1 and 15), may be used to determine acceptability and/or identify contamination as described in more detail above. Contamination may be inherent in the ingot used to form the sample material, may be introduced during welding, may be a surface contaminant diffused into the base metal, or the like. The base metal's contamination may cause variations in the thickness of the oxide film grown thereon. The differences in contrast or specular reflectance of the film in an uncontaminated area compared to a contaminated area is due to the difference in film thickness at each respective area, as discussed above.

Images of the four coupons with three different light sources, fluorescent, incandescent, and NIR, and three different lenses, taken by an SWIR camera, such as a 640HSX sold by Sensors Unlimited are discussed below with respect to FIGS. 9-13. The images were captured using a 50 mm fixed aperture lens, a 25 mm adjustable aperture lens, and high pass filter (1350 nm cut off) for use with the 25 mm lens. Fluorescent and incandescent lights both produce adequate illumination in the SWIR spectrum. In some instances, a light source, such as a photographic bench, may provide a uniform and controllable illumination of the samples. Near infrared (NIR) illumination, such as centered at approximately 850 nm (e.g. determined, as discussed above, to be a spectral range at which a peak minimum shift occurs), may be provided by one or more LEDs. The emission spectrum of the LEDs may be verified by using the spectrometer or other suitable method. The 1350 nm cut off high pass filter and 850 nm illumination source are merely used for illustrative purposes, and one of ordinary skill in the art would understand that the bandpass filter and illumination source is selected in the manner described above for selection of a wavelength band for analysis.

Figure 9:
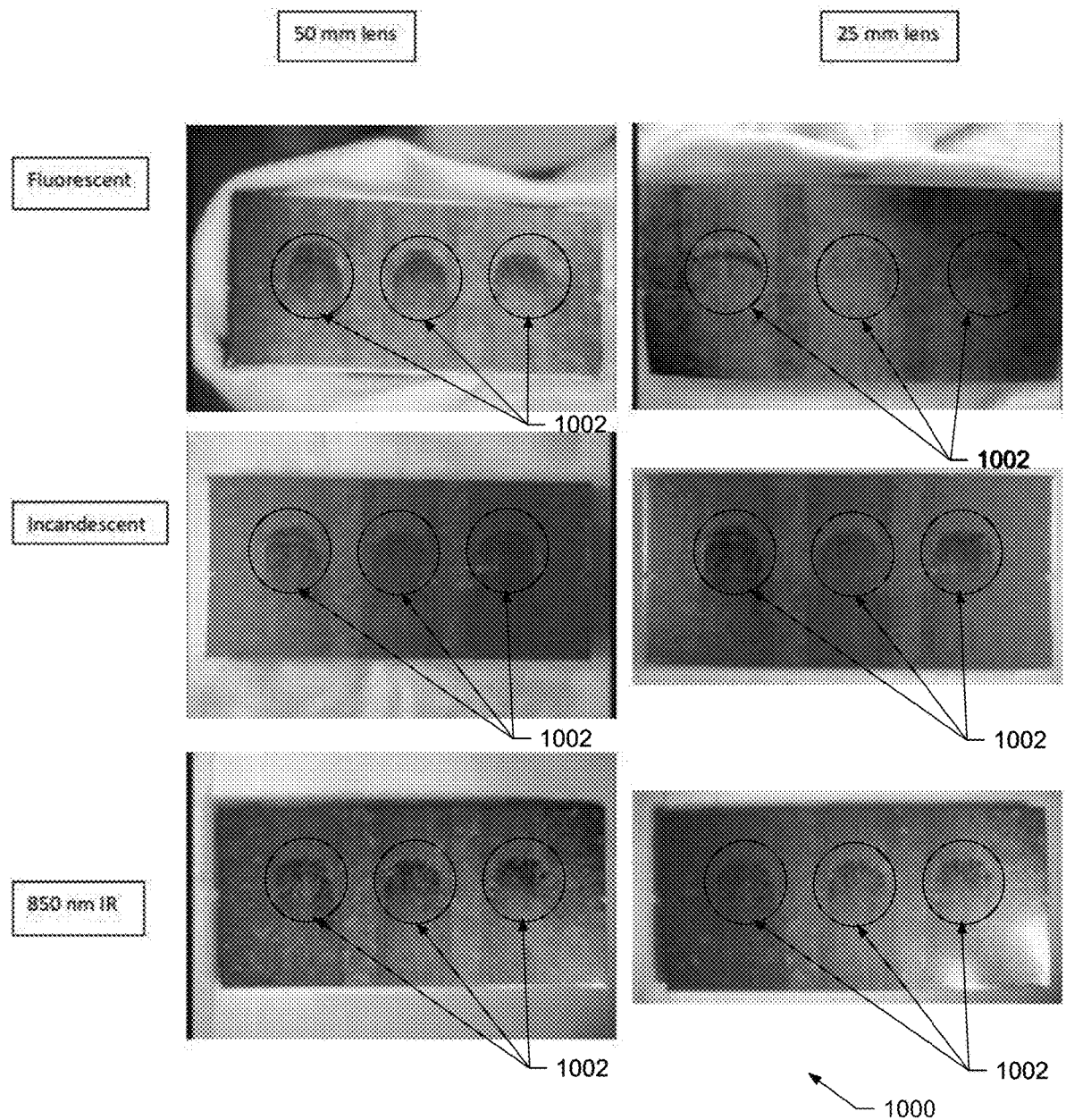
FIGS. 9-13 are photographic illustrations of images of sample composite coupons acquired by the system of FIG. 1 utilizing various lens and illumination types.
Figure 10:
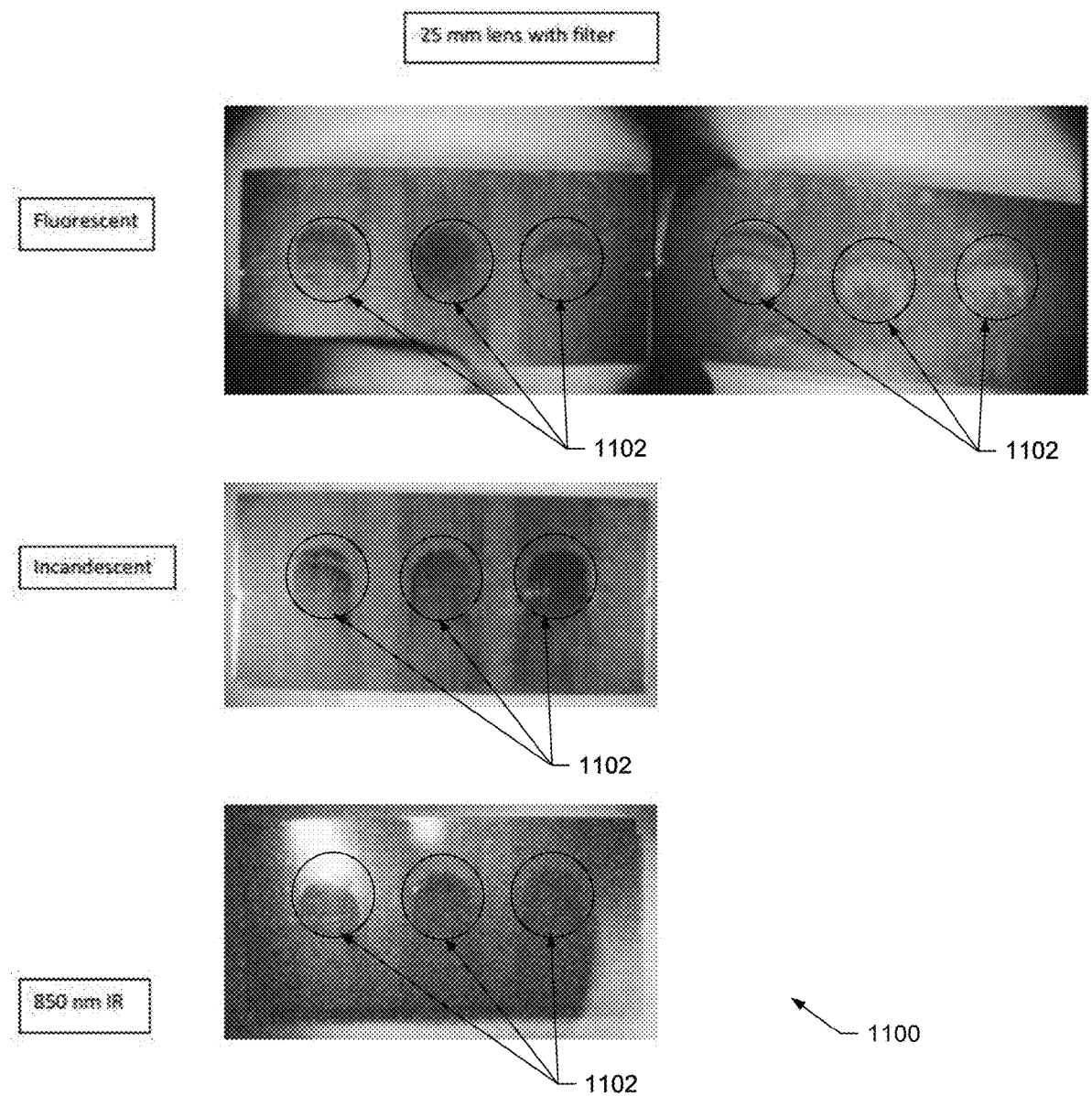

FIG. 9 illustrates coupon 3 (alloy B, thick film) images acquired by an SWIR camera with either an unfiltered 25 mm lens or an unfiltered 50 mm lens capturing light reflected by the coupon from each of a fluorescent, incandescent, and 850 nm infrared light source. With the exception of the unfiltered 25 mm lens with the fluorescent lighting, all of the combinations produce sufficient contrast to show the locations of tungsten contaminated areas 1002, e.g. the dark arch shaped portions of the coupon. FIG. 10 illustrates images 1100 of coupon 3 (alloy B, thick film) with the 25 mm filtered lens in each of the three illumination types. Each combination produces sufficient contrast to show the locations of tungsten contaminated areas 1102. Two images are shown with the combination of the filtered 25 mm lens in fluorescent light to show how the appearance of the film changes with the change of orientation of the illumination, where the illumination source was tilted manually until the observed contrast was obtained. The best single image for determining the extent of the abnormal film was taken with the filtered 25 mm lens in incandescent light. The image with the filtered 25 mm lens and the NIR illumination is grainy from under-illumination but includes sufficient contrast between the normal and abnormal film to visually identify the contaminated areas. The filtered 25 mm lens and the NIR illumination image is a combination of a short wavelength illumination with a high pass filter which mimics the results expected with a bandpass filter.

Figure 11:
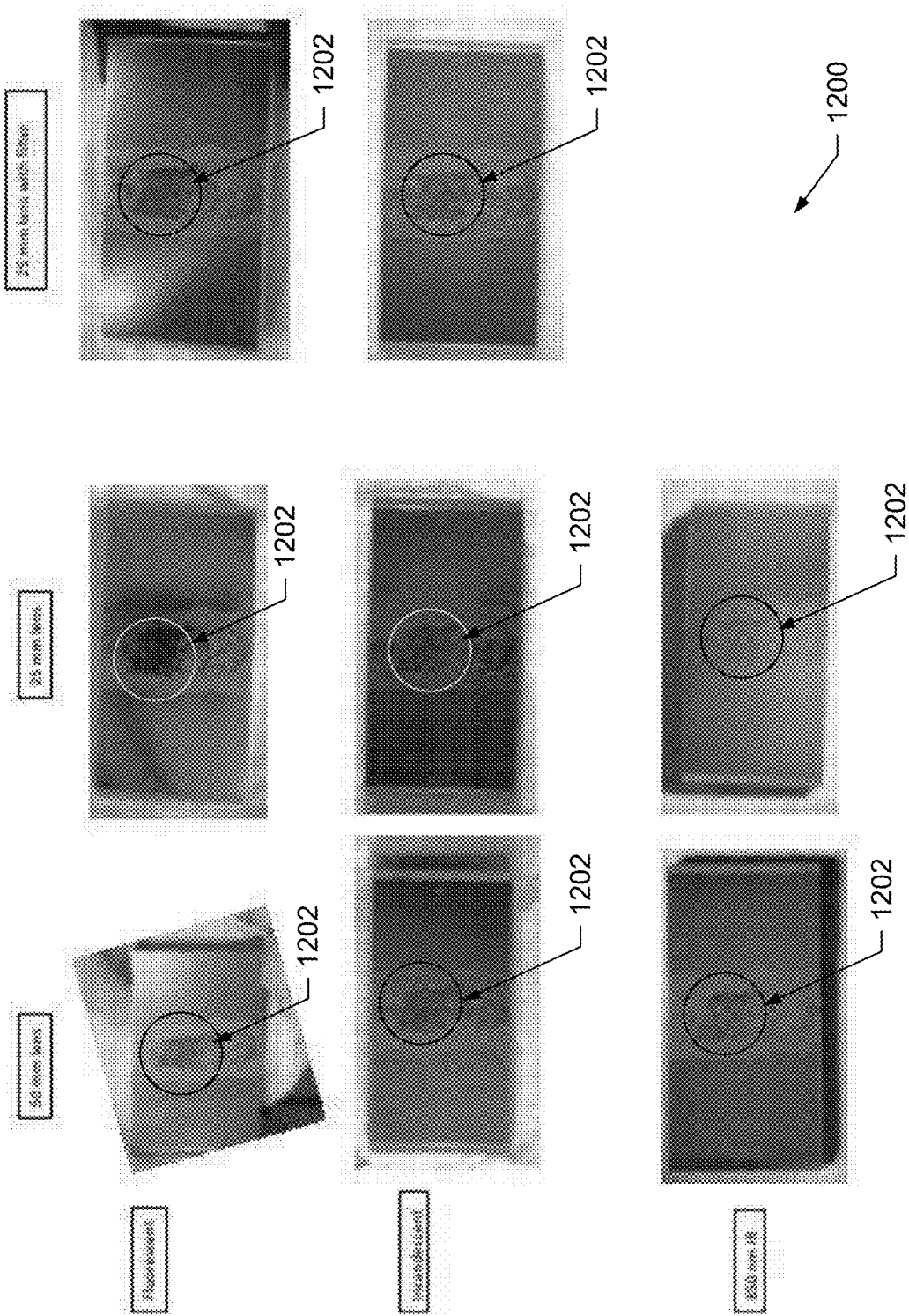

FIG. 11 illustrates images 1200 of coupon 1 (alloy A, thick film). In some of the images, the contaminated area 1202 appears to be a dark area in a roughly rectangular shape central to the coupon that spans the full width of a weld. In other images, only a narrow strip of the abnormal film is sufficiently dark to be distinguishable. This effect may be affected by the angle of the illumination and be more easily seen when the operator is manipulating the coupon while watching a live video display provided from the camera. No image is provided for the 25 mm lens filtered at 850 nm, as the high pass filter would block the image.

Figure 12:
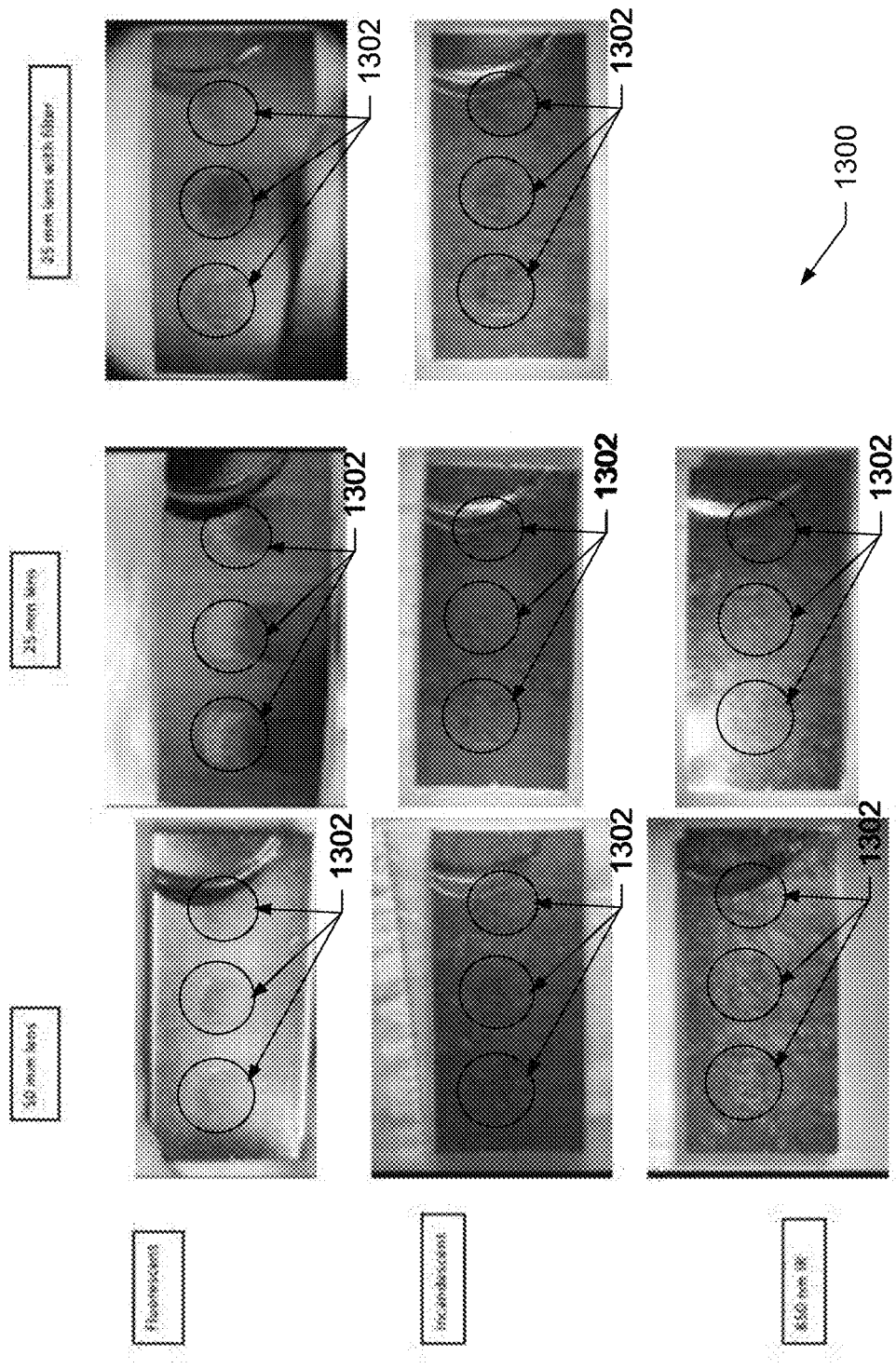

FIG. 12 provides images 1300 of coupon 4 (alloy B, thin film). In some cases, there is clear contrast between the normal and abnormal film 1302, e.g. the dark arch shaped portions, but, similar to FIGS. 9-11, in many images there is virtually none. The three areas are contaminated by tungsten. The reflected light, as in all the images in FIGS. 9-14, is diffuse.

Figure 13:
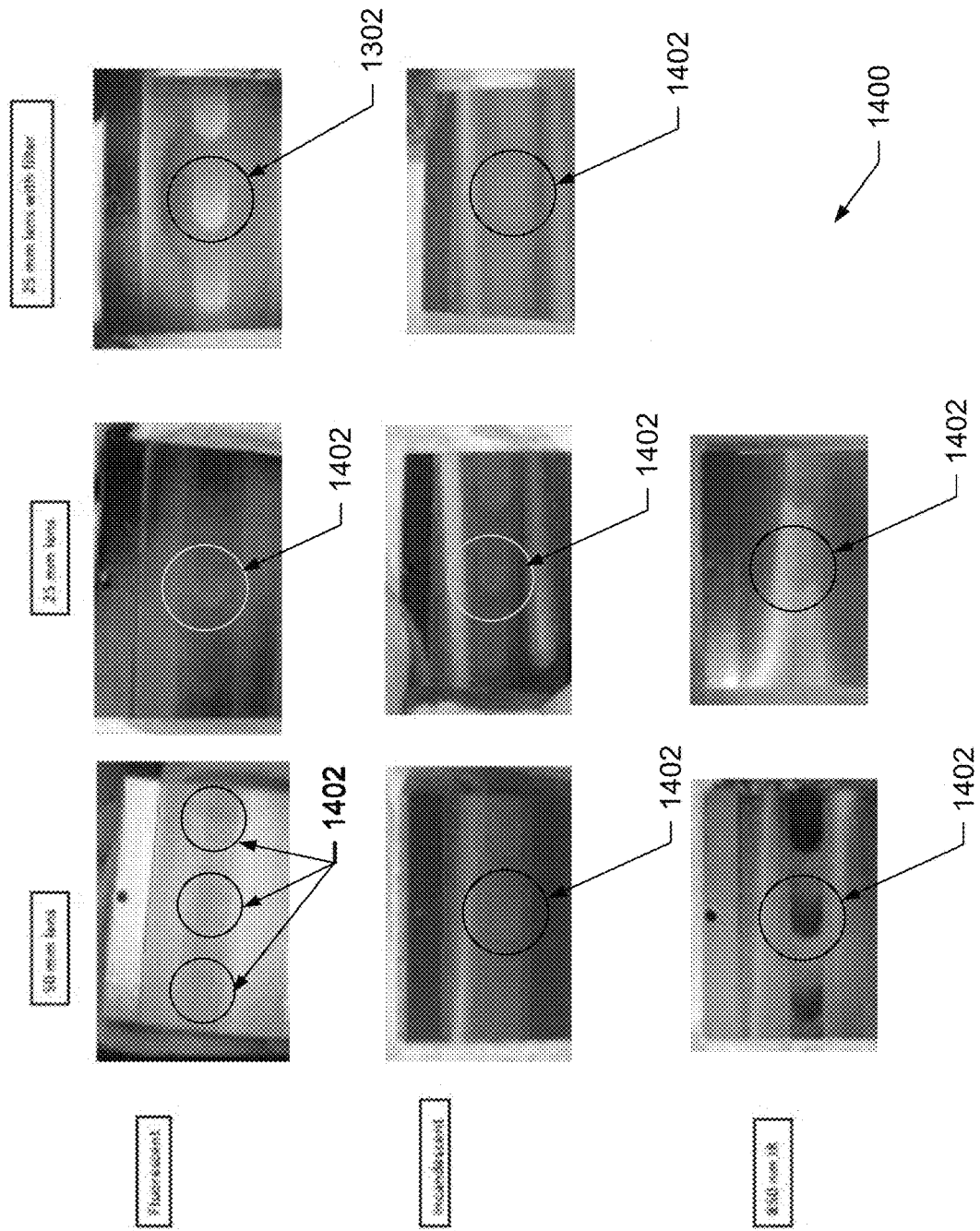

FIG. 13 illustrates images 1400 of coupon 2 (alloy A, thin film). Again, in some cases there is distinct contrast between the normal and abnormal film 1402, e.g. generally crescent shapes appearing across a substantially horizontal central portion of the coupon, but, similar to FIGS. 9-12, in many images there is virtually none. The coupon contains three tungsten-contaminated areas.

Some example specular reflectance spectra, as described herein, were captured using a reflectance spectrometer for visible light spectroscopy in the 400-900 nm range and/or a reflectance spectrometer for SWIR in the 950-1650 nm range, where the wavelength range was selected as described above. Suitable reflectance spectrometers for use in processes as described herein include a Flame Spectrometer or NIRQuest 256-2.1 sold by Ocean Optics. The spectrometers can produce both specular and diffuse reflectance spectra in the 400 to 900 nm range and 950-1650 nm range, respectively. As discussed above, spectral reflectance is measured by positioning the distal end of the spectrometer cable perpendicular to the surface of the sample material, such that the angle of incidence is equal to the angle of reflectance. Diffuse reflectance is measured by positioning the distal end of the spectrometer cable at a non-perpendicular angle relative to the surface of the sample material. The effective diameter of the optical probe of the spectrometer is approximately 1 mm. Wavelength calibration may be performed by the instrument vendor, including by scanning through grating angles and measuring a spectrum with known wavelengths. Intensity calibration may be performed by comparison to a reflectance standard, such as a National Institute of Standards and Technology (NIST) standard.

FIGS. 5-8 depict collections of specular or diffuse reflectance spectra measured by spectrometer 65 (FIGS. 1 and 15) over one or more points of the coupons of FIG. 4. Each Figure of FIGS. 5-8 corresponds to a given one of the four coupons illustrated in FIG. 4, and each spectrum line in a given Figure represents a specular or diffuse reflectance measurement at a discrete, different point on the coupon for that Figure. The differences in reflectance of the spectra indicate the difference between a normal film, e.g. expected thickness without contamination, and an abnormal film. In a manual system, the operator may log the sample identifier, position, time, or other relevant information for each measurement. In an automated embodiment, the operator enters this information through user interface 60, and processing circuitry 50 correlates the measurement data with a sample identifier, position data, date/time stamp, or the like.

Figure 5:
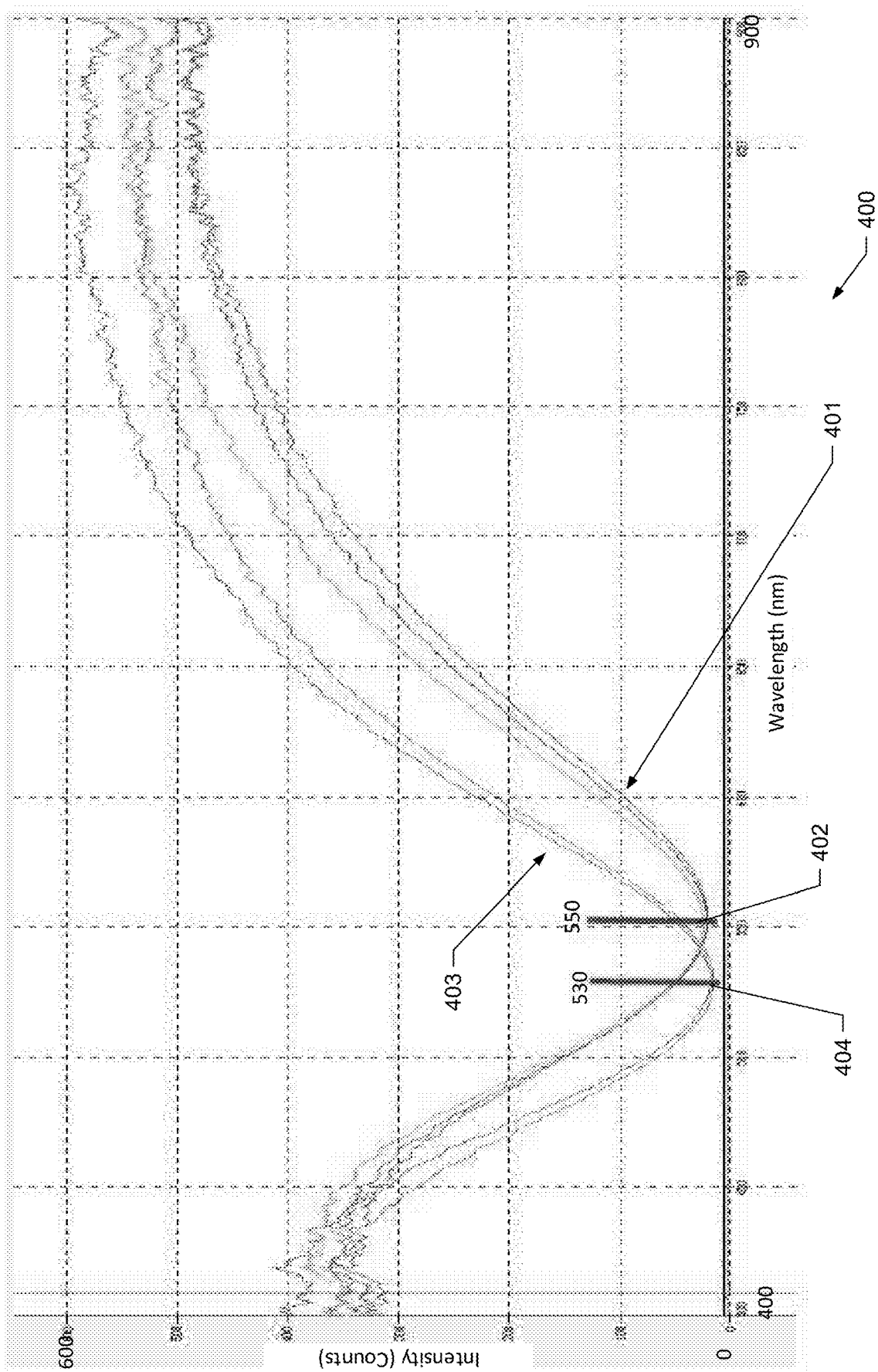
FIG. 5 is a graphical illustration of specular reflectance spectra of an thin film on an alloy substrate acquired by the system of FIG. 1.

FIG. 5 illustrates a specular reflectance spectra 400 of coupon 4 (alloy B, thin film). Three spectra 401 from areas with normal film (without layer thickness-impacting defect) comprise the reference spectrum and have reflectance minima 402 near 550 nm. Two spectra 403 from tungsten-contaminated areas have reflectance minima 404 near 530 nm. The position of the reflectance minimum on normal film is consistent from measurement to measurement, but the absolute reflectance is slightly different. These spectra have been shifted on the vertical (reflectance intensity) axis to facilitate comparison of the spectral minima. The spectra from tungsten-contaminated areas were taken by shifting the position of the probe, while visually monitoring the spectrometer output screen, to find the maximum spectral shift. Because of the density of the tungsten contamination, there is an abrupt spectral change on one side of the contaminated area on the coupon and a more gradual change on the other side. The operator and/or system 40 (FIG. 15) determines whether the minimum peak wavelength shift of 20 nm is sufficient to indicate presence of an oxide layer defect, as discussed above.

Figure 6:
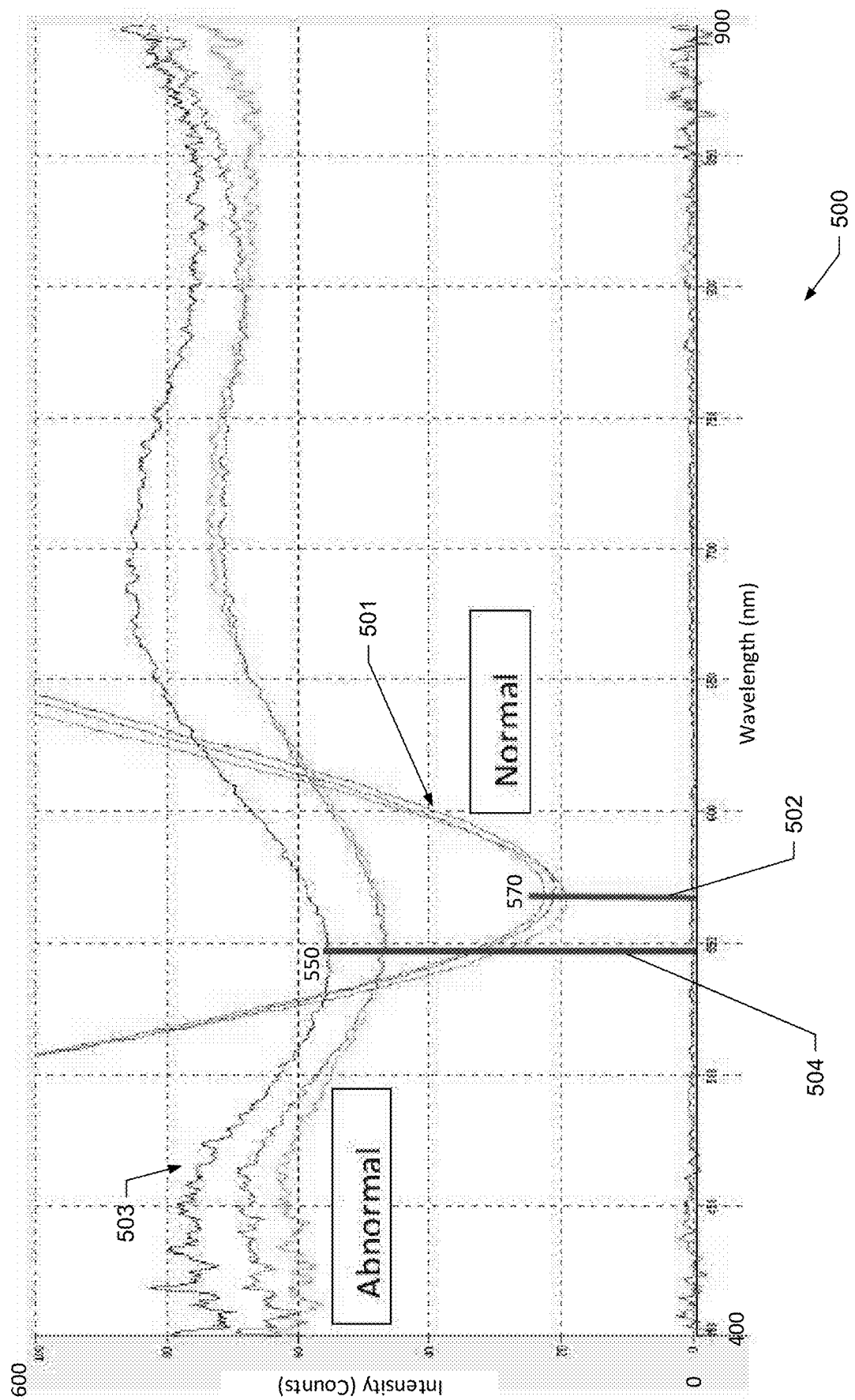
FIG. 6 is a graphical illustration of specular reflectance spectra of a thin film on Zr4 acquired by the system of FIG. 1.
Figure 7:
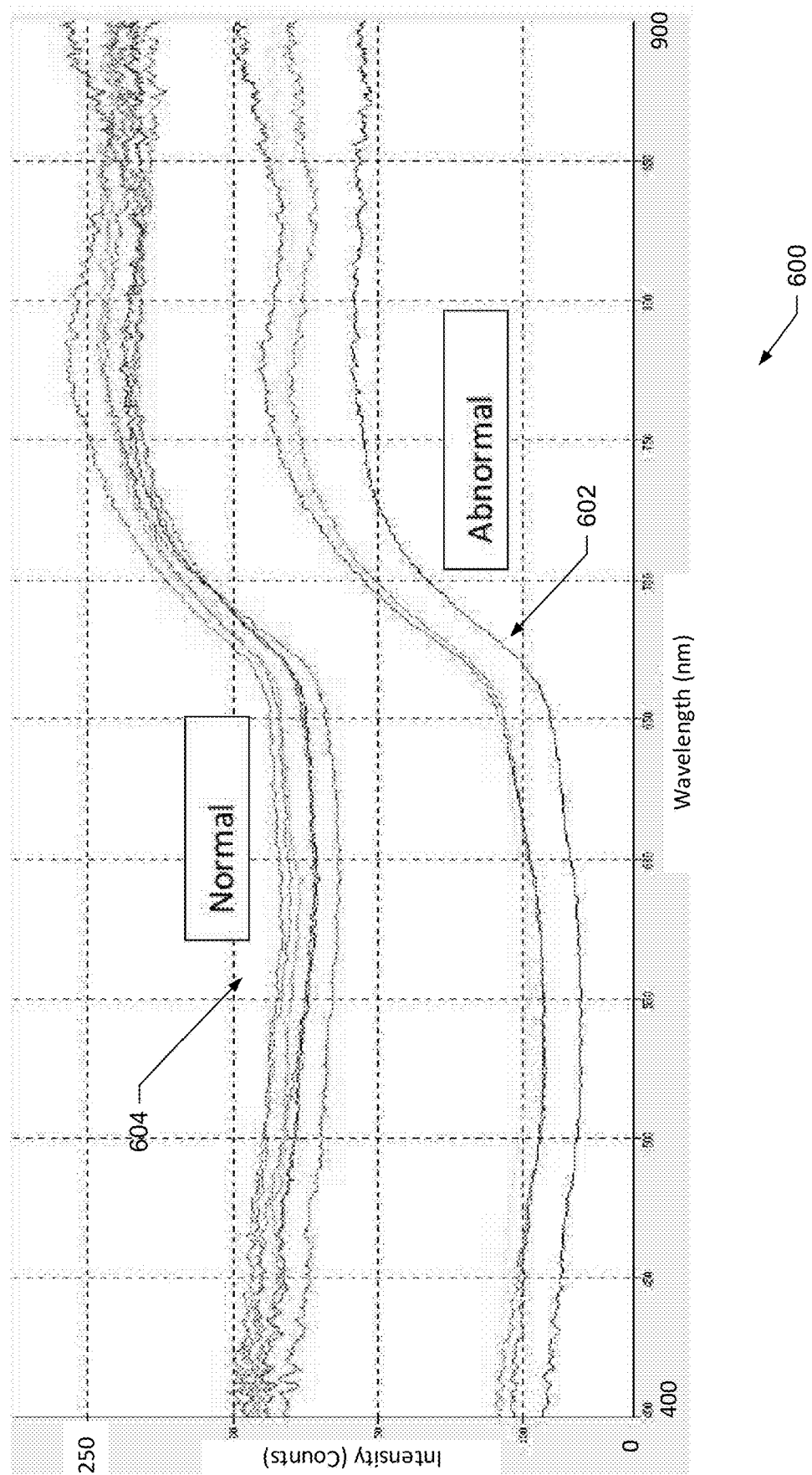
FIG. 7 is a graphical illustration of diffuse reflectance spectra of a thick film on an alloy substrate acquired by the system of FIG. 1.

FIG. 6 illustrates specular reflectance spectra 500 of coupon (alloy A, thin film). In this case, the absolute reflectance on normal film and contaminated areas is very different. Three representative spectra 501 on normal film areas comprise the reference spectrum and are shown with reflectance minima 502 near 570 nm. Three spectra 503 from tungsten contaminated areas are also shown. The abnormal spectra have a much lower total reflectance and a relatively subtle reflectance minimum 504 near 550 nm. Nonetheless, the peak minimum shift from 570 nm to 550 nm is detectable through the methods described herein, and this tungsten contamination is detectable based on peak minimum shift FIG. 7 illustrates a collection of diffuse reflectance spectra 600 on coupon 3 (alloy B, thick film). The spectra 600 have no distinguishing features, except for the total reflectance, or intensity. The total reflectance for spectra with contaminated film 602 is much lower than the normal film 604, and the presence or absence of a defect-indicating thickness variation is determined as discussed above. Thus, comparison of FIGS. 6 and 7 illustrates that some spectral characteristics for a given composite may be more apparent in a specular reflectance spectrum while other characteristics may be more apparent in a diffuse reflectance spectrum.

Figure 8:
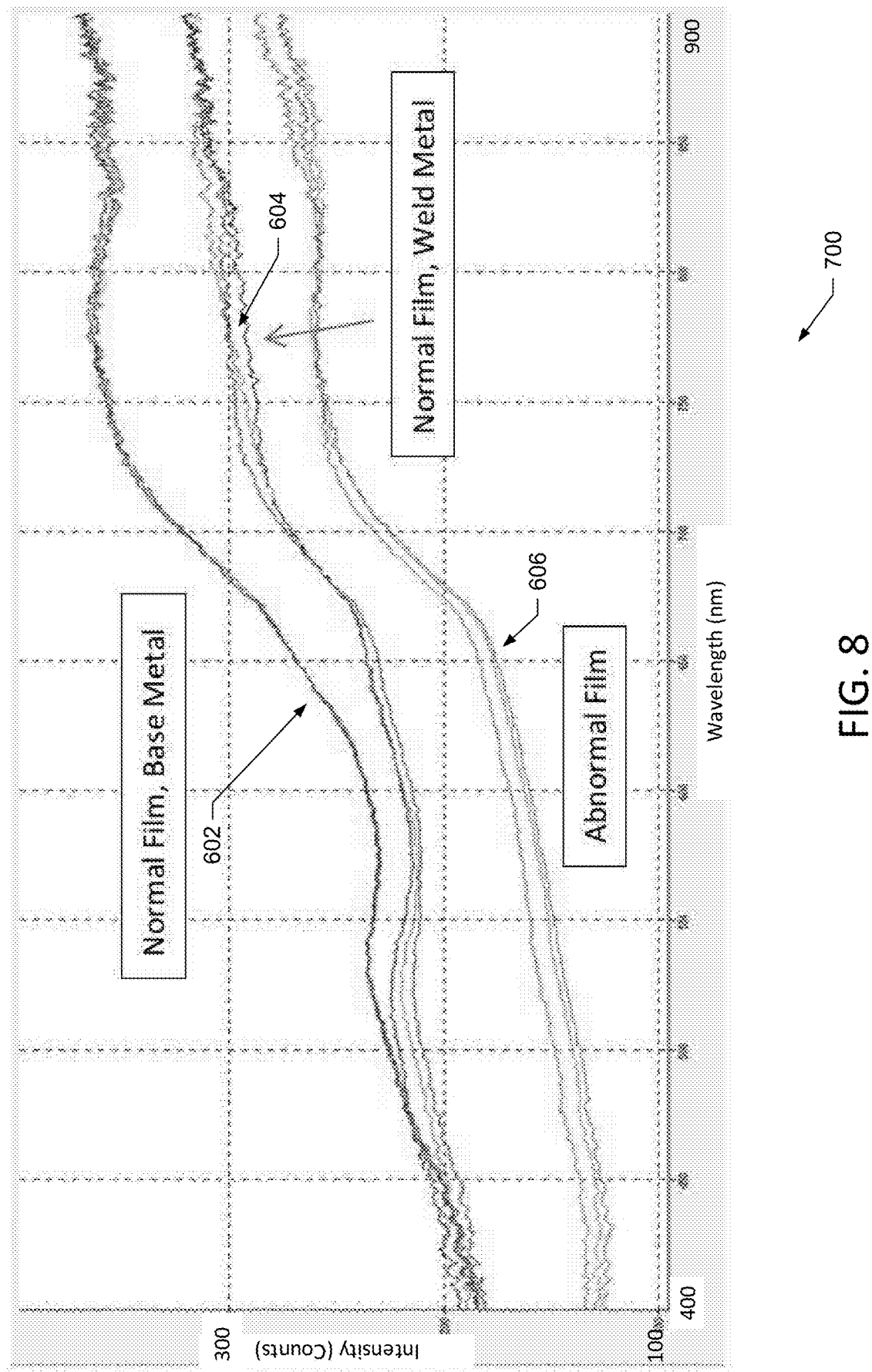
FIG. 8 is a graphical illustration of diffuse reflectance spectra of thick film on a Zr4 substrate acquired by the system of FIG. 1.

FIG. 8 is a collection of diffuse reflectance spectra 700 on coupon 1 (alloy A, thick film). Because this coupon has a weld, the material of which has a grain structure much coarser than that of the substrate alloy, there are three distinct and discrete areas of the specimen (normal weld, normal non-weld alloy, and tungsten-contaminated alloy), resulting in three discrete reflectance intensity levels for the resulting spectra. The total reflectance of the base metal 602 and weld 604 are high compared to the contaminated area 606. In this example, an operator may identify an abnormal, contaminated area by subjectively noting the intensity shift between the normal and abnormal spectral shapes. Alternatively, the processing circuitry may determine an average intensity over the illustrated wavelength range for the measured, abnormal spectrum, compare that average with the average intensity (over the same wavelength range) for an average of the reference spectra, determine whether that difference is over a predetermined threshold (determined through calibration, as discussed above), and present to the operator at the user interface display whether the measurement spectrum average intensity/normal spectrum average intensity difference is above or below the threshold, thereby allowing the operator to determine whether a defect exists based on that information.

As discussed above with regard to FIG. 1, the operator may position the camera 64 to capture one or more images of the composite sample 101. The output of the camera 64 is received by processing circuitry 50, which generates images on a user interface. The operator may then visually inspect the images as displayed on the user interface to determine acceptability or identify anomalies. Additionally or alternatively, machine imaging processes may be applied to the images to identify one or more anomalies in the images.

Figure 14:
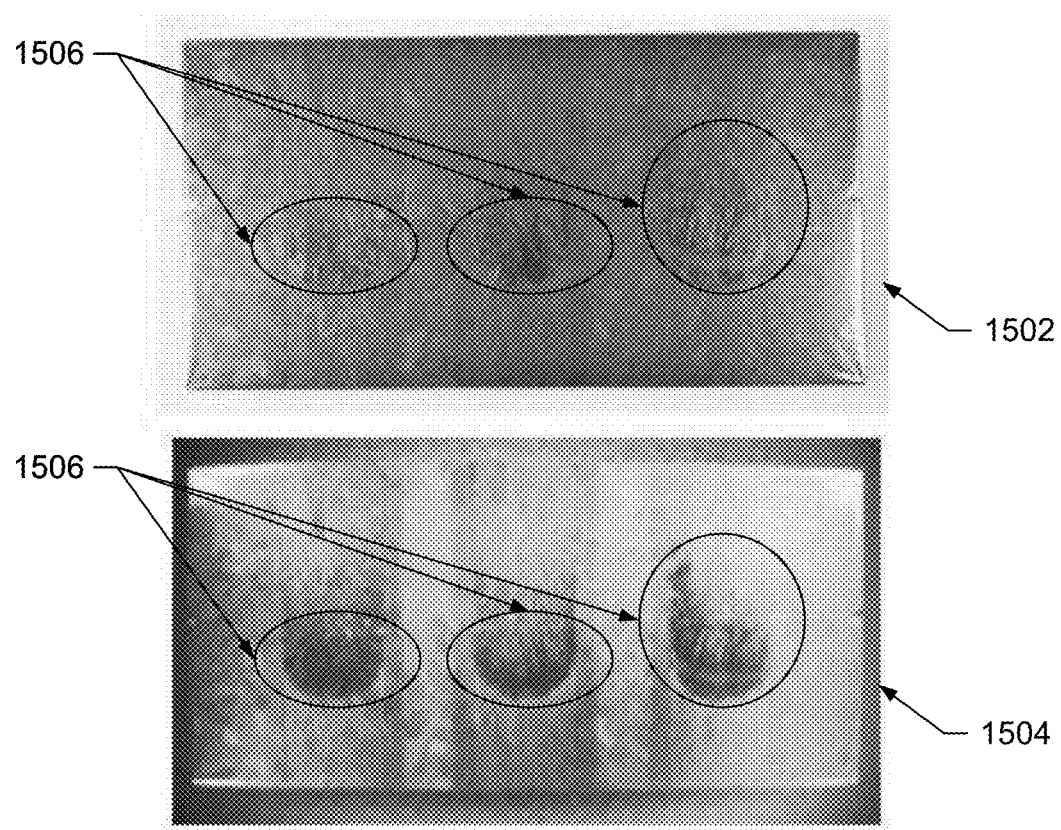
FIG. 14 is a photographic illustration of a comparison between visible spectrum imaging and SWIR imaging within the system of FIG. 1 according to an example embodiment.

FIG. 14 illustrates a direct comparison between visible spectrum imaging and SWIR imaging in identical lighting conditions, based on diffuse reflectance. Both images were taken on an optical bench lit with four 150 watt incandescent spot lights in the same configuration. The top image 1502 was taken with a standard digital SLR camera that is sensitive to visible light in the 400 to 700 nm range. The original color image was converted to grayscale for comparison purposes. The bottom image 1504 was taken with a SWIR camera and a 1150+/−10 nm bandpass filter. A comparison of the grayscale levels of normal film and abnormal film on the two images shows that the filtered SWIR image 1504 has approximately 3.5 times greater contrast than the visible light image 1504 between normal film and abnormal film 1506.

The inspection of thin and thick oxide films using optical imaging and spectroscopy improves the reliable detection of abnormal film and reduces the number of false-positive indications of tungsten contamination, e.g. because such tungsten-contaminated areas result in subtle visible contrasts, which may appear similar to non-defect contrasts, such that the operator might miss the defects relying on visual inspection alone. A thin film may be inspected with visible wavelength imaging, and such inspection may be further improved with the use of appropriate optical filters, as described herein. Visible light reflectance spectroscopy provides a clear and reproducible indicator of tungsten contamination. In some example embodiments, thin film thickness may be correlated with tungsten concentrations in a roughly quantitative manner. Thick films may be effectively inspected using diffuse reflectance using visible light (see, e.g., the discussion above with respect to FIG. 7), which provides a quantifiable measurement that correlates well with a conventional, qualitative visual inspection. With appropriate filters, abnormal film may be located using a SWIR camera.

Example Apparatus

An example embodiment of the invention will now be described with reference to FIG. 15, which illustrates certain elements of an apparatus for oxide layer inspection according to an example embodiment. The apparatus of FIG. 15, or portions thereof, may be employed, for example, on a mobile computing device or a variety of other devices (such as, for example, computer terminal, a network device, server, proxy, or the like. Alternatively, embodiments may be employed on a combination of devices in a client/server relationship (e.g. the computing terminal and a mobile computing device). Furthermore, it should be noted that the devices or elements described below may not be mandatory and thus some may be omitted in certain embodiments.

An apparatus configured for oxide layer inspection is provided. The apparatus may be an embodiment of inspection module 44 or a device hosting inspection module 44. As discussed below, the inspection module 44 includes computer readable instructions configured to cause the processing circuitry to perform the oxide layer inspection or portions of the oxide layer inspection as discussed below or otherwise herein. In an example embodiment, the apparatus may include or otherwise be in communication with processing circuitry 50 that is configured to perform data processing, application execution and other processing and management services. In one embodiment, processing circuitry 50 may include storage device 54 and processor 52 that are in communication with or otherwise control user interface 60, a device interface 62, camera 64, spectrometer 65, a positioning motor(s) 66, and/or an illumination source(s) 68. As such, processing circuitry 50 is embodied as a circuit chip (e.g. an integrated circuit chip) configured (e.g. with hardware, software or a combination of hardware and software) to perform operations described herein. However, in some embodiments, processing circuitry 50 may be embodied as a portion of a server, computer, laptop, workstation or even one of various mobile computing devices. In situations where processing circuitry 50 is embodied as a server or at a remotely located computing device, user interface 60 may be disposed at another device (e.g. at a computer terminal or client device) in communication with processing circuitry 50 via device interface 62 and/or a network (e.g. network 30).

User interface 60 is in communication with processing circuitry 50 to receive an indication of an operator input at user interface 60 and/or to provide an audible, visual, mechanical or other output to the operator. As such, user interface 60 may include, for example, a keyboard, a mouse, a joystick, a display, a touch screen, a microphone, a speaker, mobile device, or other input/output mechanisms. In embodiments where the apparatus is embodied at a server or other network entity, user interface 60 may be limited or even eliminated in some cases. Alternatively, as indicated above, user interface 60 may be remotely located.

Device interface 62 may include one or more interface mechanisms for enabling communication with other devices and/or networks. In some cases, device interface 62 may be any means such as a device or circuitry embodied in hardware, software, or a combination of hardware and software that is configured to receive and/or transmit data from/to a network and/or any other device or module in communication with processing circuitry 50. In this regard, device interface 62 may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods. In situations where device interface 62 communicates with a network, the network may be any of various examples of wireless or wired communication networks such as, for example, data networks like a Local Area Network (LAN), a Metropolitan Area Network (MAN), and/or a Wide Area Network (WAN), such as the Internet.

In an example embodiment, storage device 54 may include one or more non-transitory storage or memory devices such as, for example, volatile and/or non-volatile memory that may be either fixed or removable. Storage device 54 may be configured to store information, data, applications, instructions or the like for enabling the apparatus to carry out various functions in accordance with example embodiments of the present invention. For example, storage device 54 could be configured to buffer input data for processing by processor 52. Additionally or alternatively, storage device 54 could be configured to store instructions for execution by processor 52. As yet another alternative, storage device 54 may include one of a plurality of databases (e.g. a database server) that may store a variety of files, contents or data sets. Among contents of the storage device 54, applications (e.g. a client application or server application 44) may be stored for execution by processor 52 in order to carry out the functionality associated with each respective application, including the functions discussed herein.

Processor 52 may be embodied in a number of different ways. For example, processor 52 may be embodied as various processing means such as a microprocessor or other processing element, a coprocessor, a controller or various other computing or processing devices including integrated circuits such as, for example, an ASIC (application specific integrated circuit), an FPGA (field programmable gate array), a hardware accelerator, or the like. In an example embodiment, processor 52 may be configured to execute instructions stored in storage device 54 or otherwise accessible to processor 52. As such, whether configured by hardware or software methods, or by a combination thereof, processor 52 may represent an entity (e.g. physically embodied in circuitry) capable of performing operations according to embodiments of the present invention while configured accordingly. Thus, for example, when processor 52 is embodied as an ASIC, FPGA or the like, processor 52 may be specifically configured hardware for conducting the operations described herein. Alternatively, as another example, when processor 52 is embodied as an executor of software instructions, the instructions may specifically configure processor 52 to perform the operations described herein.

In an example embodiment, processor 52 (or processing circuitry 50) may be embodied as, include or otherwise control the inspection module 44, which may be any means, such as, a device or circuitry operating in accordance with software or otherwise embodied in hardware or a combination of hardware and software (e.g. processor 52 operating under software control, processor 52 embodied as an ASIC or FPGA specifically configured to perform the operations described herein, or a combination thereof) thereby configuring the device or circuitry to perform the corresponding functions of inspection module 44 as described below.

In an example embodiment, processing circuitry 50 may include or otherwise be in communication with camera 64. Camera 64 may be a digital camera configured to capture image data associated with the surrounding environment. The image data may be one or more fixed images or a moving image. Camera 64 may be configured to capture image data in the shortwave infrared spectrum, such as a 640HSX SWIR camera sold by Sensors Unlimited. The SWIR camera may include one or more bandpass filters configured to pass at least a portion of the wavelength range of a selected illumination source. Additionally or alternatively, camera 64 may be configured to capture camera data in other spectral ranges including ultraviolet, (UV), visible (VIS), infrared (IR), long-wave infrared (LWIR), or other suitable wavelengths. In an example embodiment, camera 64 may be a hyperspectral camera configured to capture camera data for a plurality of wavelength ranges simultaneously.

In an example embodiment, processing circuitry 50 may include or otherwise be in communication with spectrometer 65. Spectrometer 65 may be a reflectance spectrometer configured to measure the light reflected from a surface of a sample. In an example embodiment, the spectrometer may be configured to measure reflectance of light in the 400-900 nm range, 950-1650 nm range or other suitable range depending on the sample material and/or the desire or expected thickness of the oxide layer, such as a Flame Spectrometer or NIRQuest 256-2.1 sold by Ocean Optics.

In an example embodiment, processing circuitry 50 may include or otherwise be in communication with one or more positioning motors 66. Positioning motors 66 may be configured to move an inspection plate, camera 64, spectrometer and/or inspection cable between a two or more inspection positions. Positioning motors 66 may be electronic servo motors, or any other suitable motor known in the art. The size and type of positioning motor 66 may be chosen based on the size and/or weight of the camera, the spectrometer, the sample and/or the inspection plate.

In an example embodiment, processing circuitry 50 may include or otherwise be in communication with one or more illumination sources 68. The illumination source 68 may include one or more light emitting diodes (LEDs), florescent lights, incandescent lights, or the like configured for a specific light wavelength or broadband. The light wavelength of illumination source 68 may be selected based on the sample material, desire or expected oxide layer thickness, or the like, such as including the expected or desired oxide layer thickness, as discussed above. In some example embodiments, the light wavelength may be shortwave infrared (SWIR), near infrared (NIR), ultraviolet, (UV), visible (VIS), infrared (IR), long-wave infrared (LWIR), or other suitable wavelength.

Inspection module 44 manager may include tools to facilitate oxide layer inspections via network 30. The inspection module 44 includes non-transitory computer readable instructions stored in a memory, such as storage device 54. The inspection module 44 is configured to cause the processing circuitry 52 to perform the oxide layer inspection, as discussed above. In an example embodiment, inspection module 44 is configured to receive an indication of a material type for the sample, select an expected oxide layer thickness based on the material type, select an illumination source to create the desired spectral contrast based on the oxide layer thickness, illuminate at least a portion of the sample with the selected illumination source, and determine an oxide layer acceptability based on analyzing the thickness of the oxide layer in an image captured by the camera, wherein the camera is aligned with the illumination source.

Example Oxide Layer Inspection Flow Chart

Figure 16:
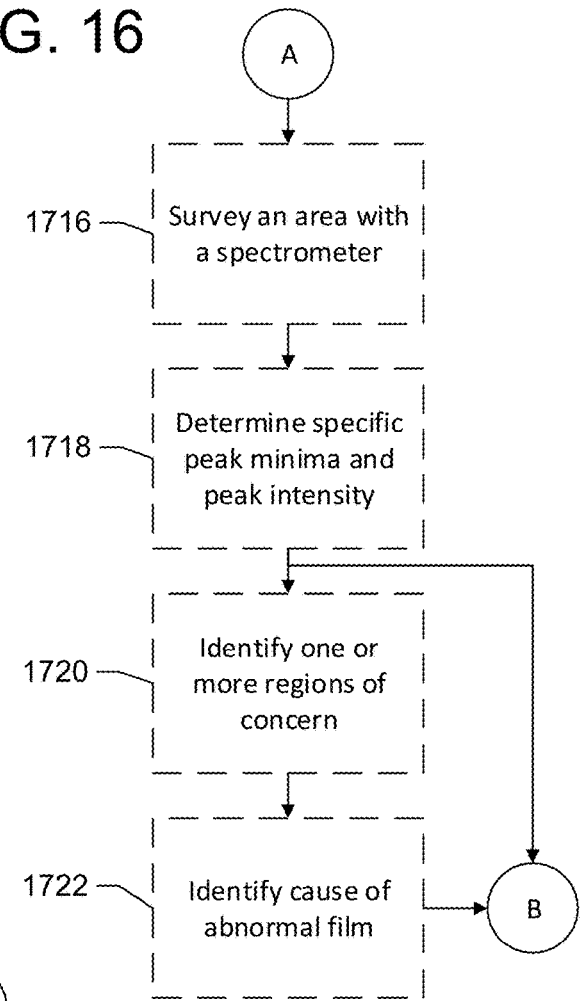
FIG. 16 is a flow chart for the oxide layer inspection method according to an example embodiment.
Figure 16:
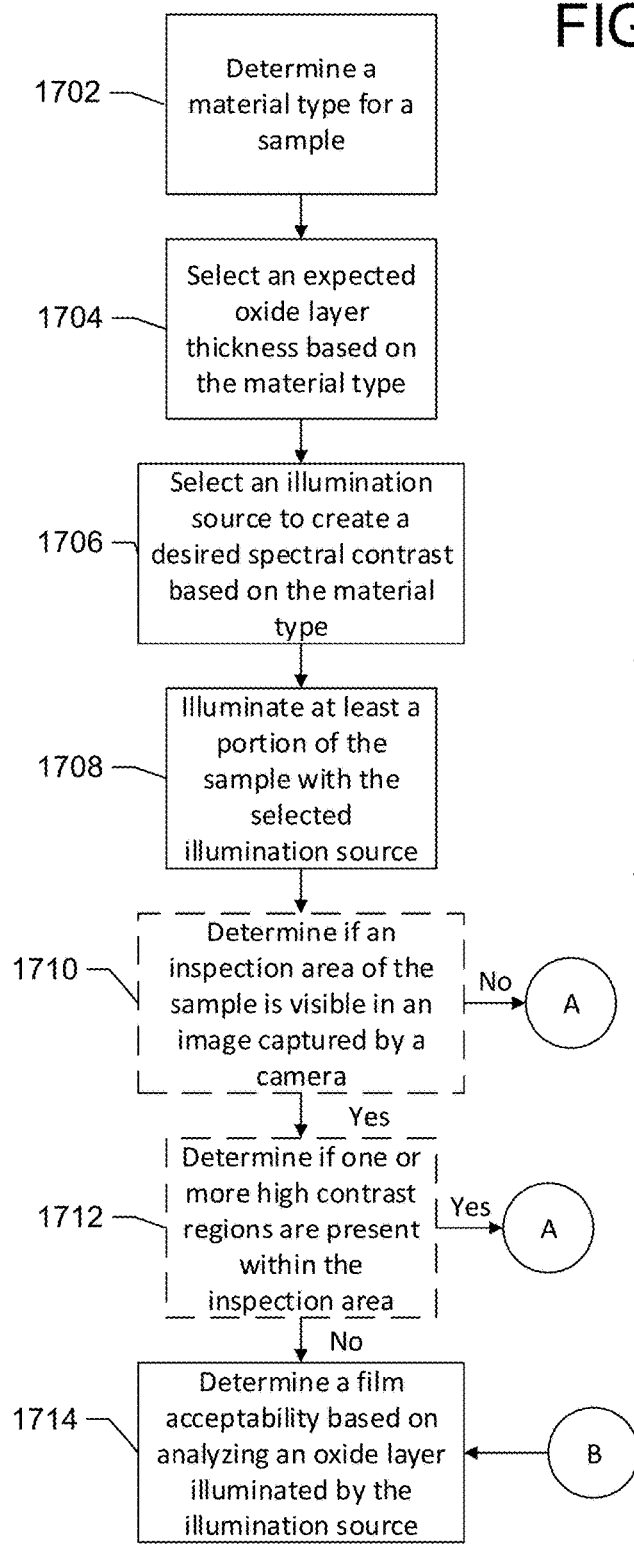

From a technical perspective, inspection module 44 described above may be used to support some or all of the operations described above. As such, the platform described in FIG. 15 may be used to facilitate the implementation of several computer program and/or network communication based interactions. As an example, FIG. 16 is a flowchart of a method and program product according to an example embodiment of the invention. It will be understood that each block of the flowchart, and combinations of blocks in the flowchart, may be implemented by various means, such as hardware, firmware, processor, circuitry and/or other devices associated with execution of software including one or more computer program instructions. For example, one or more of the procedures described above may be embodied by computer program instructions. In this regard, the computer program instructions which embody the procedures described above may be stored by a memory device of a user terminal, or the like and executed by a processor therein. As will be appreciated, any such computer program instructions may be loaded onto a computer or other programmable apparatus (e.g. hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

Additionally or alternatively, one or more of the blocks of the flowchart may be performed manually by an operator with or without the assistance of the platform described above with reference to FIG. 15.

In this regard, a method according to one embodiment of the invention is shown in FIG. 16 utilizing one or more elements of FIGS. 1 and 15. The method may include one or more optional operations, as denoted by the dashed box. The method may include determining a material type for a sample at operation 1702. The material type may be determined by inspection of a manufacturer's description of the component or material, system diagrams, or other reliable source. In an instance in which the inspection system 40 is utilized, the user enters the material type via a user interface 60. The material type may be, for example, a material ID code (a code that corresponds directly to the material type) or a component ID code (a code that identifies the component part). Where component ID codes are used, processing circuitry 50 has a lookup table at storage device 54 that correlates component ID codes with the material of which the components are made. When the user enters the component ID code, the processing circuitry references the lookup table to determine the material type for the designated component.

The method continues with selecting an expected oxide layer thickness based on the material type at operation 1704. The expected or desired film thickness is based on the type of material and, in some cases, the method of growing the oxide layer. The film thickness for the material may be a known standard thickness, which can be identified in a reference table that correlates desired material thickness with the material and/or method of growing the oxide layer or may be included in a manufacture's description. The expected film thickness may include an expected value or range determined by empirical testing. In some example embodiments, the manufacturer may determine or provide an expected value and/or range and manufacturing tolerance band, such as +/−1 percent, 5 percent, 10 percent, or the like, which may be used for determination of acceptability of the oxide film. In an instance in which inspection system 40 is utilized, the operator may enter, via user interface 60, the expected film thickness, or processing circuitry 50 may determine the expected or desired film thickness based on identification of the substrate material and/or the growth method entered as described above, such as by accessing a reference table stored in memory at 54. The processing circuitry may determine the illumination source based on the expected film thickness and/or the material type, again by correlating this data to the desired illumination source in a lookup table at memory 54.

Next, the method proceeds by selecting an illumination source to create a desired spectral contrast based on the material type at operation 1706. The processing circuitry or a user may determine the illumination source based on the expected film thickness and/or the material type, by correlating this data to the desired illumination source in a lookup table. The desired illumination source may be determined based on calculations, lab testing, trial and error, or the like, as discussed above. In some example embodiments, the wavelength range of the illumination source includes the expected thickness of the oxide film.

At operation 1708, the method includes illuminating at least a portion of the sample with the selected illumination source. In laboratory testing, the camera and/or spectrometer may be mounted on a frame (not shown) relative to an inspection platform 103 so that the inspection platform is within the camera's (or the camera's optics') field of view and/or so that spectrometer cable 110 can reach and scan the surface of a composite sample 101 placed on the platform. The operator places composite sample 101 on platform 103 for inspection by camera 64 and/or spectrometer 65. The operator positions camera lens 104 or distal end of inspection cable 110 at one or more inspection areas to capture camera data and/or measurement data. In embodiments in which one or more components are being inspected in place within a larger device or system, such as during installation, repair, welding, or the like, the operator may dispose camera 64 and/or spectrometer 65 to view one or more inspection areas on the material. Camera 64 and/or spectrometer 65 may be mounted on an adjustable arm or may be handheld to maintain the camera 64 and/or spectrometer 65 in a position while collecting the camera data or measurement data.

As discussed above, the method includes two analysis components, e.g. the camera and the spectrometer. The use of the analysis components may be based on the accessibility of the material surface and/or quality assurance requirements associated with the sample. The method may proceed by determining if an inspection area of the sample is visible in an image captured by the camera at operation 1710. The operator or, if utilized, processing circuitry 50 first determines whether the inspection area is within the camera image (the camera's field of view), such as by the operator's visual verification of the real time camera data on user interface 60 and the processing circuitry's receipt of an input from the operator via the user interface confirming that the image includes the inspection area. In addition or as an alternative to the processing circuitry 50 determining that the inspection area is within the camera image based on the user input, the processing circuitry may also determine if one or more features appear within the camera image using image processing. If the inspection area is not in the observable area of the image, camera 64 may be repositioned, or the method may continue with the spectrometer measurements, as discussed below.

If the operator or the processing circuitry confirms that the inspection area is within the camera image, the method continues by determining if one more high contrast areas are present in the inspection area at operation 1712. In some embodiments, the operator determines the presence of one or more high contrast areas entirely manually, by observing the image data provided by the system at the display of user interface 60. In another, the operator visually inspects the image and, upon so identifying one or more possible high contrast areas, then performs a survey of the identified areas using spectrometer 65, as discussed herein. Additionally or alternatively, processing circuitry 50 may analyze the image acquired by camera 64 and transmitted to the processing circuitry to automatically determine high contrast areas or indicate to the operator (through information driven to the user interface display) areas in the image for the operator's further analysis, e.g. utilizing the spectrometer. In one such embodiment, processing circuitry 50 applies machine vision or object detection image processing techniques to determine the one or more high contrast areas.

If the inspection area is visible, no high contrast areas are identified, and the quality assurance requirements do not include spectrographic analysis, the method may continue by determining a film acceptability based on analyzing the oxide layer illuminated by the illumination source. If the sample does not include a high contrast area, the film is acceptable.

If the inspection area is not visible, or a high contrast area is present, the method may continue by surveying an area with a spectrometer at operation 1716. The operator or the processing system 40 positions the distal end of inspection cable 110 at the inspection area. In an example in which the processing circuitry 50 controls the position of the inspection cable, the inspection cable may include motorized joints, including positioning motors or guide cables, operated by positioning motors that are, in turn, controlled by the processor. The spectrometer 65 determines, and generates corresponding measurement data of, the reflectance of the material over the wavelength range of the illumination source's generated light. The operator or processing system may position the inspection cable 110 and take measurements at one or more points in the inspection area, such as surveying a plurality of locations within an inspection area, such as a measurement per millimeter, a measurement per centimeter, or other suitable measurement density.

Next, the method includes determining a specific minimum peak and peak intensity at operation 1718. Once the inspection area has been surveyed, the operator or processing circuitry 50 may analyze the measurement data to determine a specific minimum peak, e.g. the wavelength of the low point of the measurement data, and peak intensity, e.g. the intensity value for the specific minimum peak, for each measurement of the measurement data. In some example embodiments, the method may proceed to operation 1714, determination of the film acceptability. The operator or processing circuitry 50 may compare the specific minimum and/or the specific peak intensity to an average reference measurement, a plurality of measurements, and/or a predetermined reference measurement to identify one or more measurements which deviate from the desired or expected measurement data. For example, the specific minimum may be higher or lower than the expected or compared measurement data, which may be indicative of an abnormal film. Additionally or alternatively, the system may compare an intensity of the measured spectrum to a reference intensity, which may be higher or lower than the compared measurement data, which may be indicative of an abnormal film. The operator or processing circuitry may determine the minimum peak shift and/or the intensity shift values and compare these values to the look up table to determine a film thickness. The operator or processing circuitry may then determine if the determined film thickness is within an acceptable range, e.g. manufacture's tolerance, based on the expected film thickness.

In some example embodiments, the method includes identifying one or more regions of concern at operation 1720. Locations that are not within the acceptable range may be flagged by the processing circuitry and/or the operator. At operation 1722, the method includes identifying the cause of an abnormal film. Once any regions of concern are identified, the operator or processing circuitry 50 determine the cause of the abnormal film. The measurement data for the regions identified as abnormal may be compared to one or more known measurements, such as known film thicknesses and/or film thicknesses with known contaminants. The operator and/or processing circuitry 50 may determine the cause of the abnormal film by selecting a known measurement that most closely matches the measurement data of the abnormal film. The process may then proceed to operation 1714, determining a film acceptability, for example lack of contamination in the oxide layer, lack of a particular contaminant in the oxide layer, less than a maximum contamination level of a predetermined contaminant in the oxide layer. As discussed above, the determination of the acceptability of the film based on analyzing the oxide layer illuminated by the illumination source may include one or more of camera image analysis, spectral analysis, and contaminant identification. The acceptability may be based on one or more acceptance criteria, including without limitation, lack of high contrast areas in a camera image, a predetermined number of high contrast areas in a camera image, a predetermined minimum peak, a predetermined peak intensity, a maximum deviation from an expected minimum peak, a maximum deviation from a peak intensity, a minimum film thickness based on the measured minimum peak or peak intensity, a lack of contamination of the oxide layer, a lack of a certain predetermined contaminant in the oxide layer, a maximum contamination level for a predetermined contaminate in the oxide layer, or other suitable criteria.

In an example embodiment, an apparatus for performing the method of FIG. 16 above may comprise a processor (e.g. processor 52) or processing circuitry configured to perform some or each of the operations (1702-1722) described above. The processor may, for example, be configured to perform the operations (1702-1722) by performing hardware implemented logical functions, executing stored instructions, or executing algorithms for performing each of the operations.

In some embodiments, the processor or processing circuitry may be further configured for additional operations or optional modifications to operations 1702-1722. In this regard, for example, the method also includes determining if a predetermined inspection area is visible in an image captured by a camera and determining if the oxide layer acceptability is based on analysis of the oxide layer in the image. In some example embodiments, in response to the inspection area not being visible, the method also includes surveying the inspection area point to point with a spectrometer. In an example embodiment, the method includes determining a specific minimum peak or specific peak intensity, identifying a region of concern having an abnormal oxide layer based on the specific minimum peak or the specific peak intensity, and identifying the cause of the abnormal oxide layer based on the specific minimum peak or specific peak intensity, and determining if the oxide layer acceptability is further based on the cause of the abnormal oxide layer. In some example embodiments, the method includes determining if one or more high contrast areas are present in the image. In an example embodiment, in response to determining one or more high contrast regions are present, the method also includes surveying the high contrast region with a spectrometer, determining a specific peak minima or a specific peak intensity for the one or more high contrast regions, and identifying the cause of the one or more high contrast regions based on the specific peak minima or specific peak intensity, and determining the oxide layer acceptability is further based on the cause of the one or more high contrast regions. In some example embodiments, the method also includes changing an angle of the sample relative to the camera and determining the oxide layer acceptability is further based on analyzing the oxide layer in a second image captured by the camera at the changed angle. In an example embodiment, the illumination source comprises a short range infrared (SWIR) light. In some example embodiments, the illumination source comprises a near infrared (NIR) light. In an example embodiment, the sample comprises a zirconium alloy.

Many modifications and other embodiments of the invention set forth herein will come to mind to one skilled in the art to which this invention pertains to having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A method of inspecting an oxide layer comprising:
   determining a reference spectrum of light reflected from a surface of a first sample of a first material having an oxide film thereon over a wavelength range encompassed by the reflected light, wherein the first sample does not include a predetermined defect;
   selecting an illumination source that outputs light encompassing at least part of the wavelength range;
   illuminating at least a portion of a second sample of a second material having an oxide layer with the light from the selected illumination source, wherein the light reflected from the first material and light from the selected illumination source reflected from the second material have respective spectral responses over the wavelength range that have a predetermined relationship;
   receiving the light output from the illumination source that has reflected from the second sample, including the oxide layer of the second sample;
   acquiring a measurement spectrum from the light received at the receiving step over at least part of the wavelength range that is encompassed by the light output from the illumination source;
   comparing at least one characteristic of the measurement spectrum to the same at least one characteristic of the reference spectrum, wherein the at least one characteristic varies in a predetermined manner depending upon whether a material and oxide film from which received light reflects contains the predetermined defect; and
   determining whether the material and oxide film of the second sample contain the predetermined defect based upon the comparison of the at least one characteristic of the measurement spectrum to the same at least one characteristic of the reference spectrum.

2. The method of claim 1, wherein the step of determining the reference spectrum comprises acquiring at least one sample spectrum of light reflected from a calibration sample of the material having an oxide layer, where the calibration sample does not have the predetermined defect.

3. The method of claim 1, wherein the step of determining the reference spectrum comprises acquiring a plurality of sample spectra of light reflected from a calibration sample of the material having an oxide layer, where the calibration sample does not have the predetermined defect, and averaging the plurality of sample spectra to define the reference spectrum.

4. The method of claim 1, wherein the step of determining the reference spectrum comprises calculating the reference spectrum from a model based on knowledge of the first material and an expected thickness of its oxide film when no defect is present.

5. The method of claim 1, wherein the illumination source is broadband.

6. The method of claim 1, wherein the step of receiving the light comprises filtering at least one of the received light and data corresponding to the received light, by wavelength.

7. The method of claim 1, wherein the at least one characteristic comprises intensity minimum peak wavelength.

8. The method of claim 1, wherein the at least one characteristic comprises spectral intensity.

* * * * *